Nov. 27, 1951  H. BLANCHETTE  2,576,096
MOLDING AND WRAPPING MACHINE
Filed Dec. 21, 1949  15 Sheets-Sheet 6
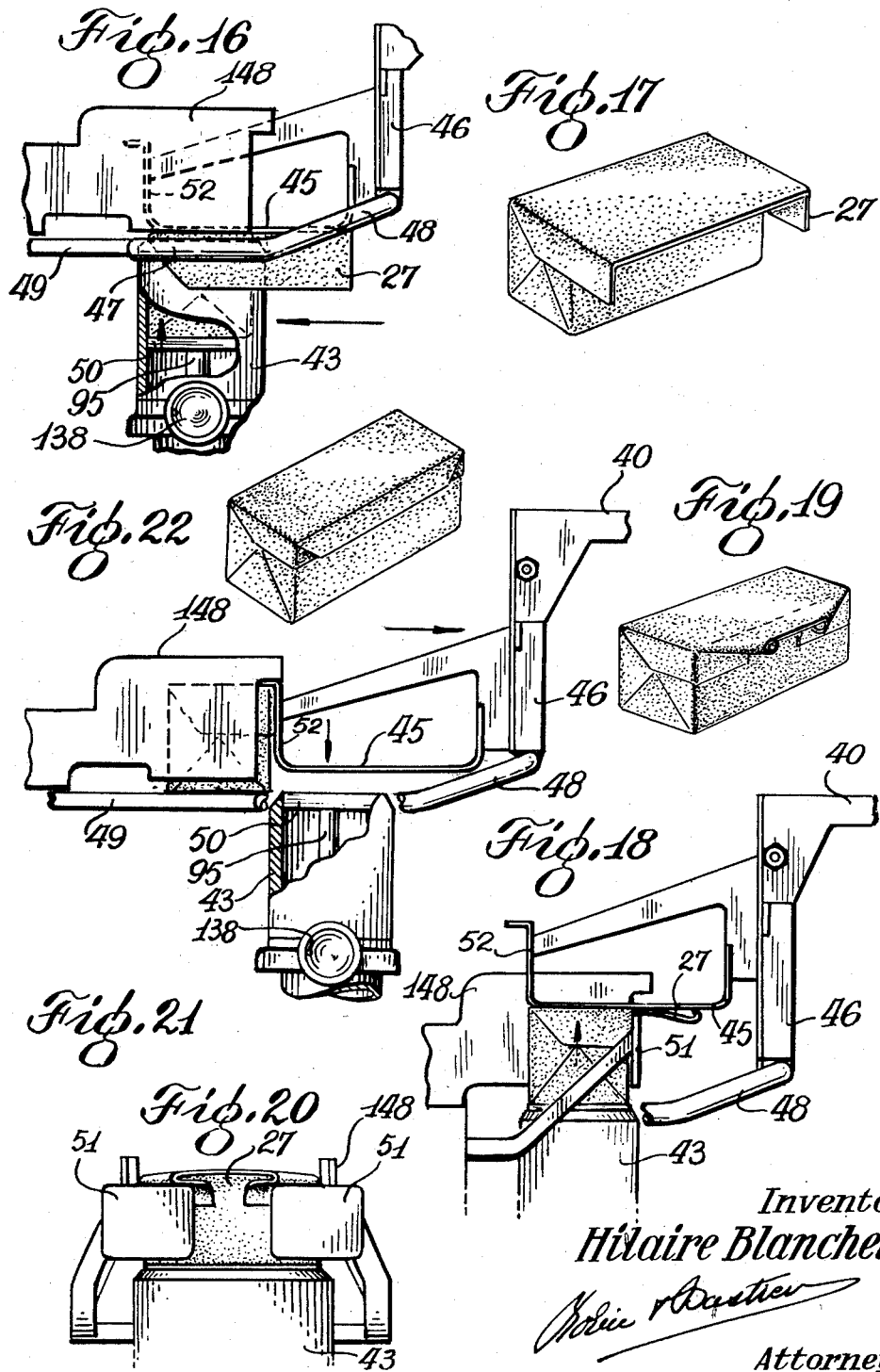
Inventor
Hilaire Blanchette
Attorneys

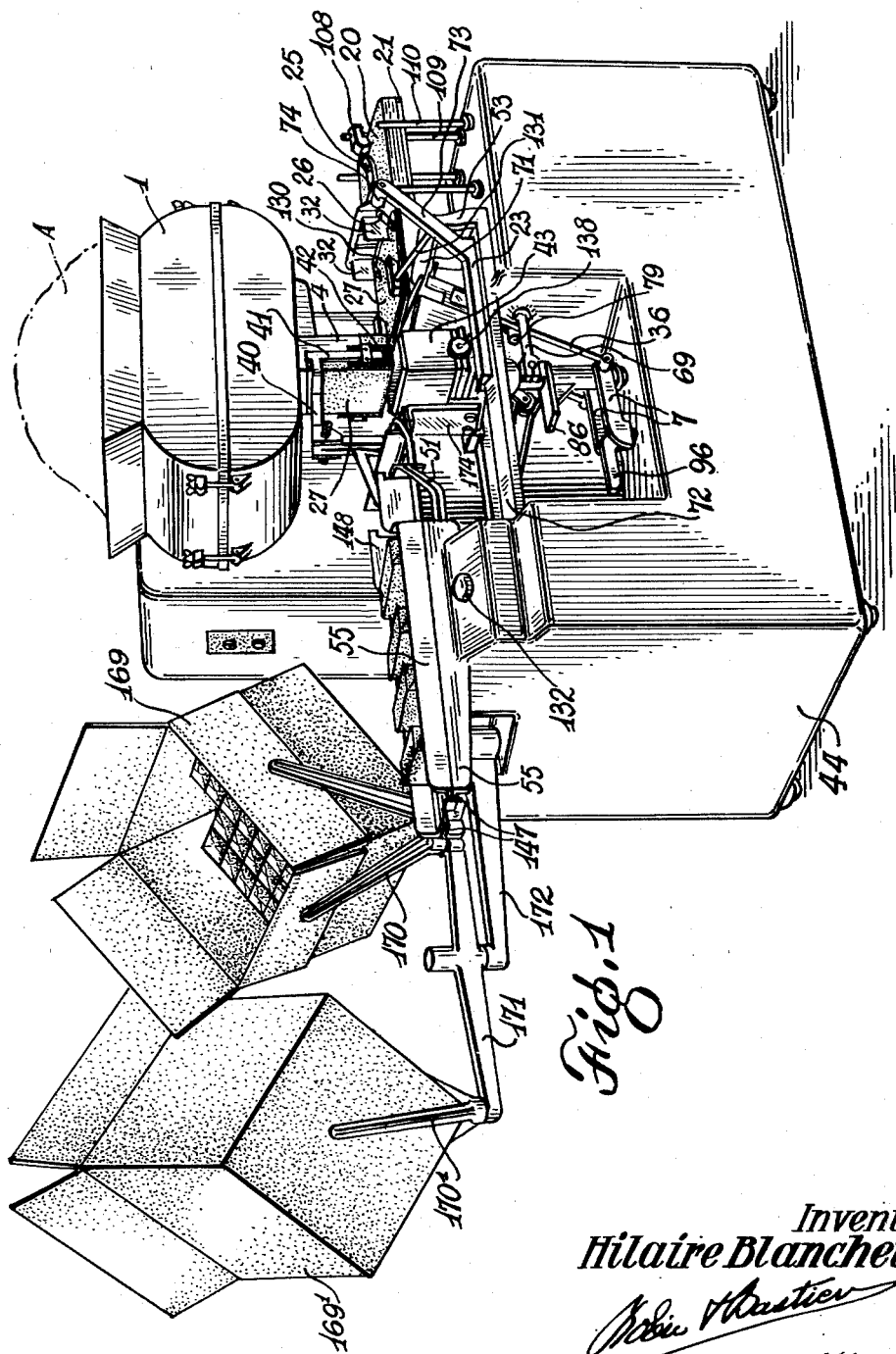

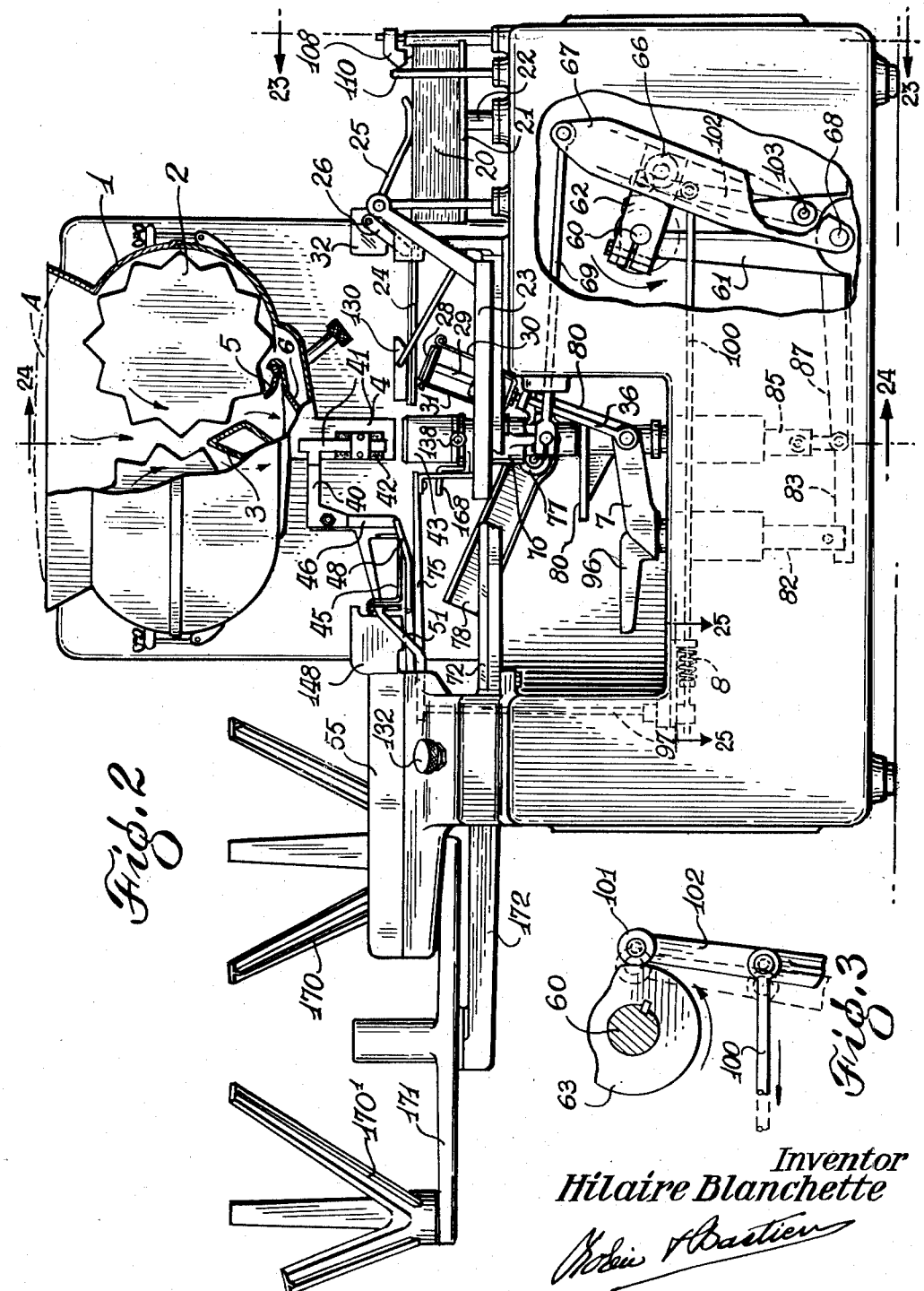

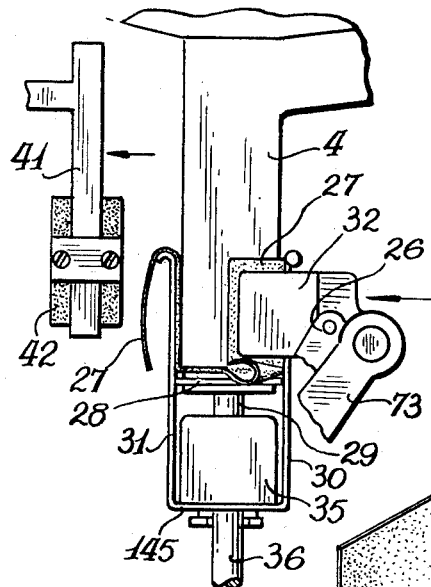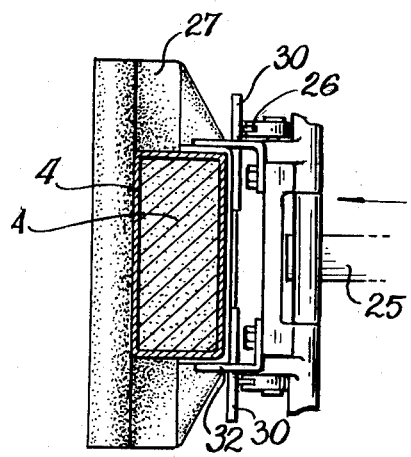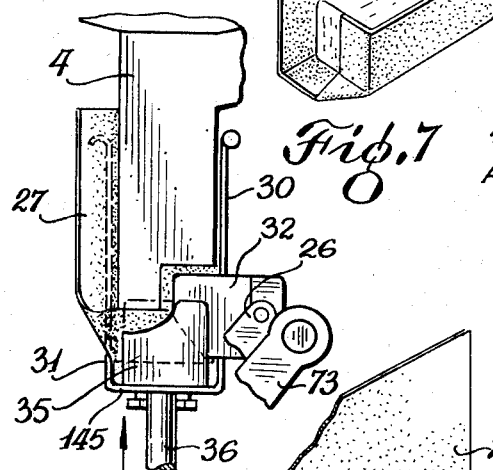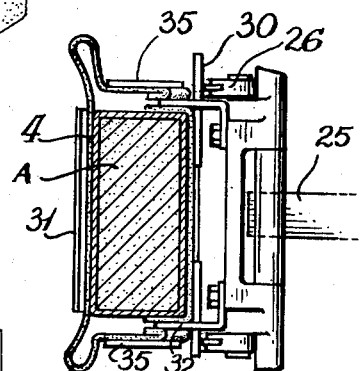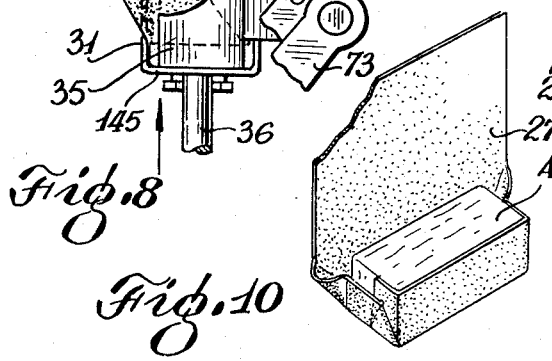

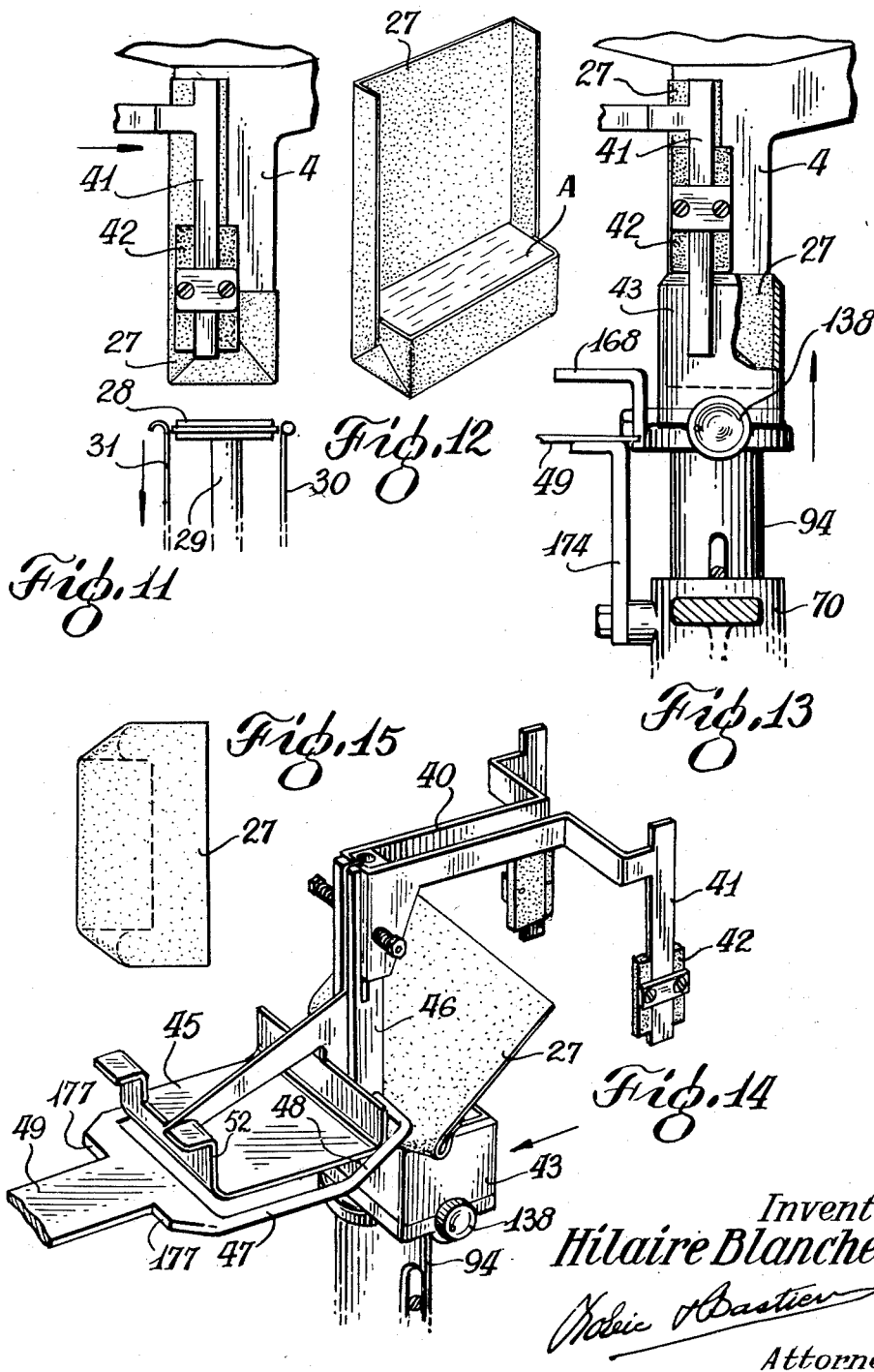

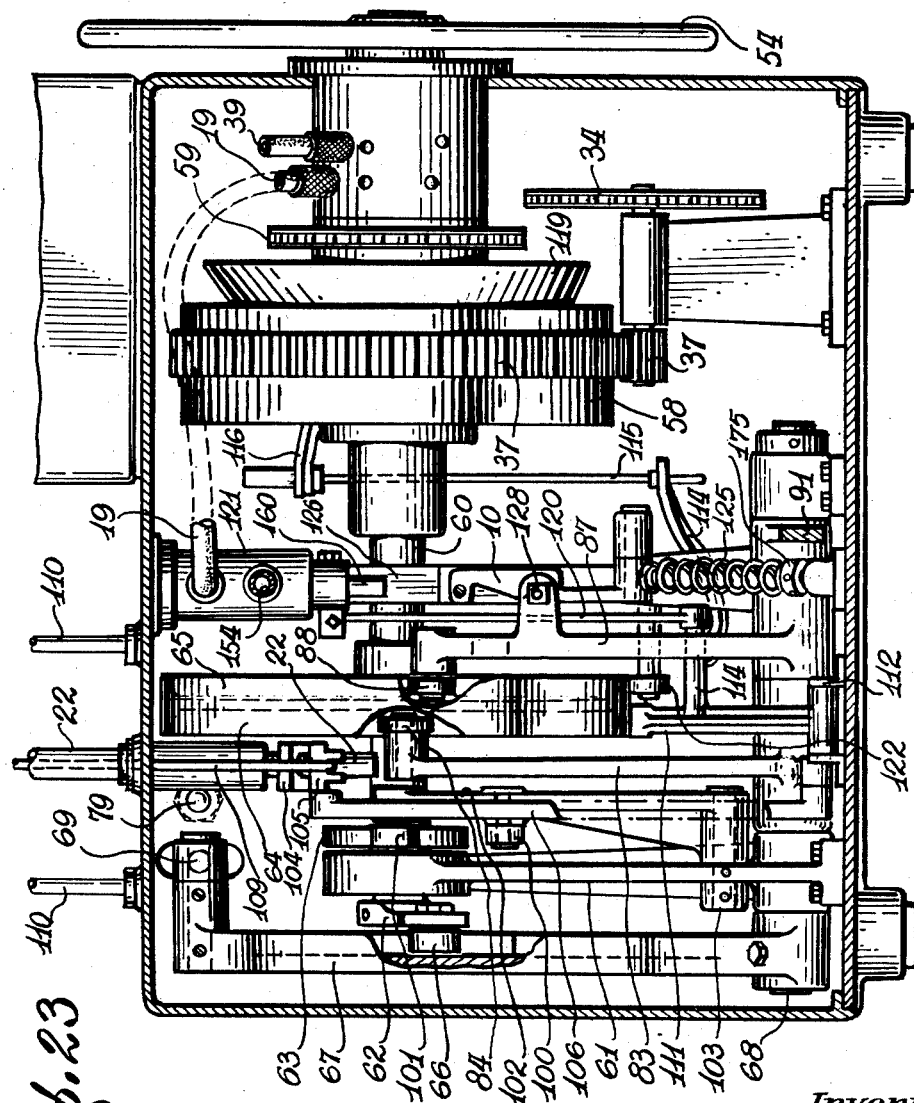

Inventor
Hilaire Blanchette
Attorneys

Nov. 27, 1951  H. BLANCHETTE  2,576,096
MOLDING AND WRAPPING MACHINE
Filed Dec. 21, 1949  15 Sheets-Sheet 9
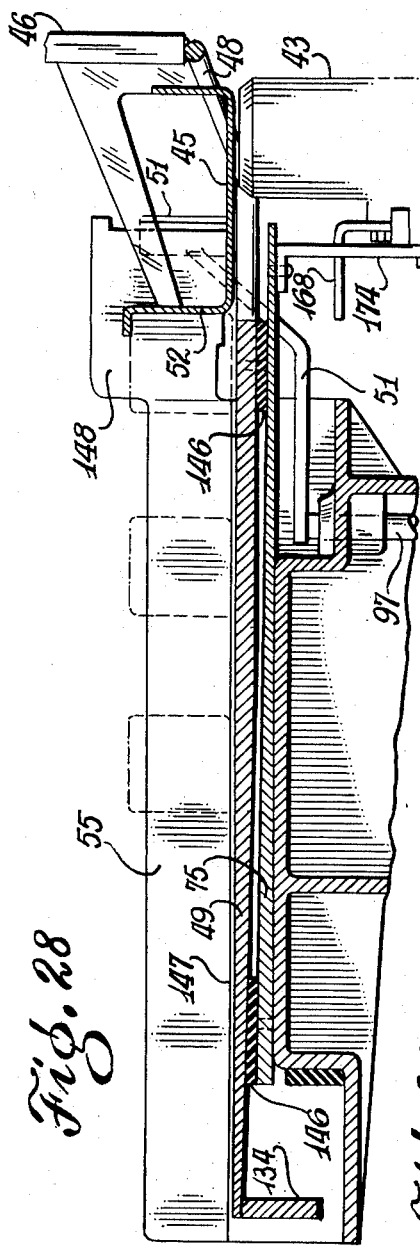
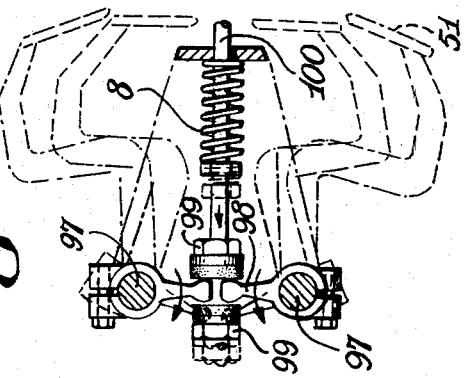
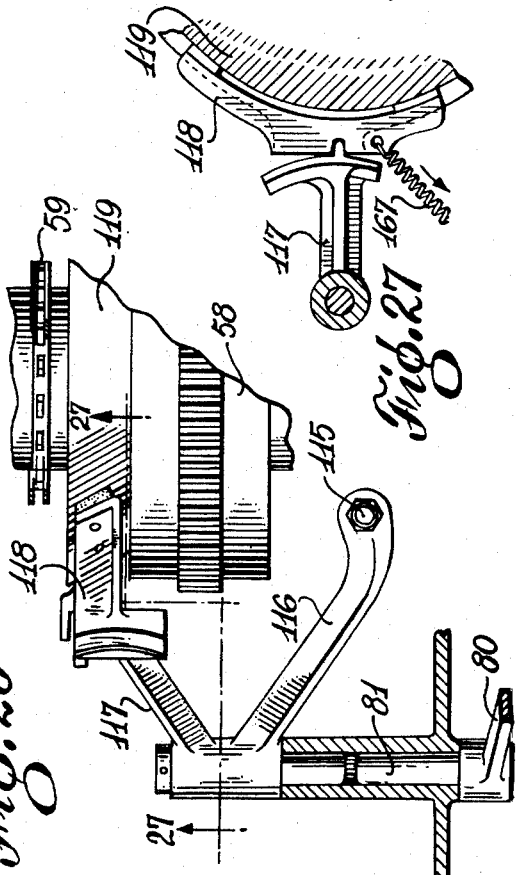
Inventor
Hilaire Blanchette
Attorneys

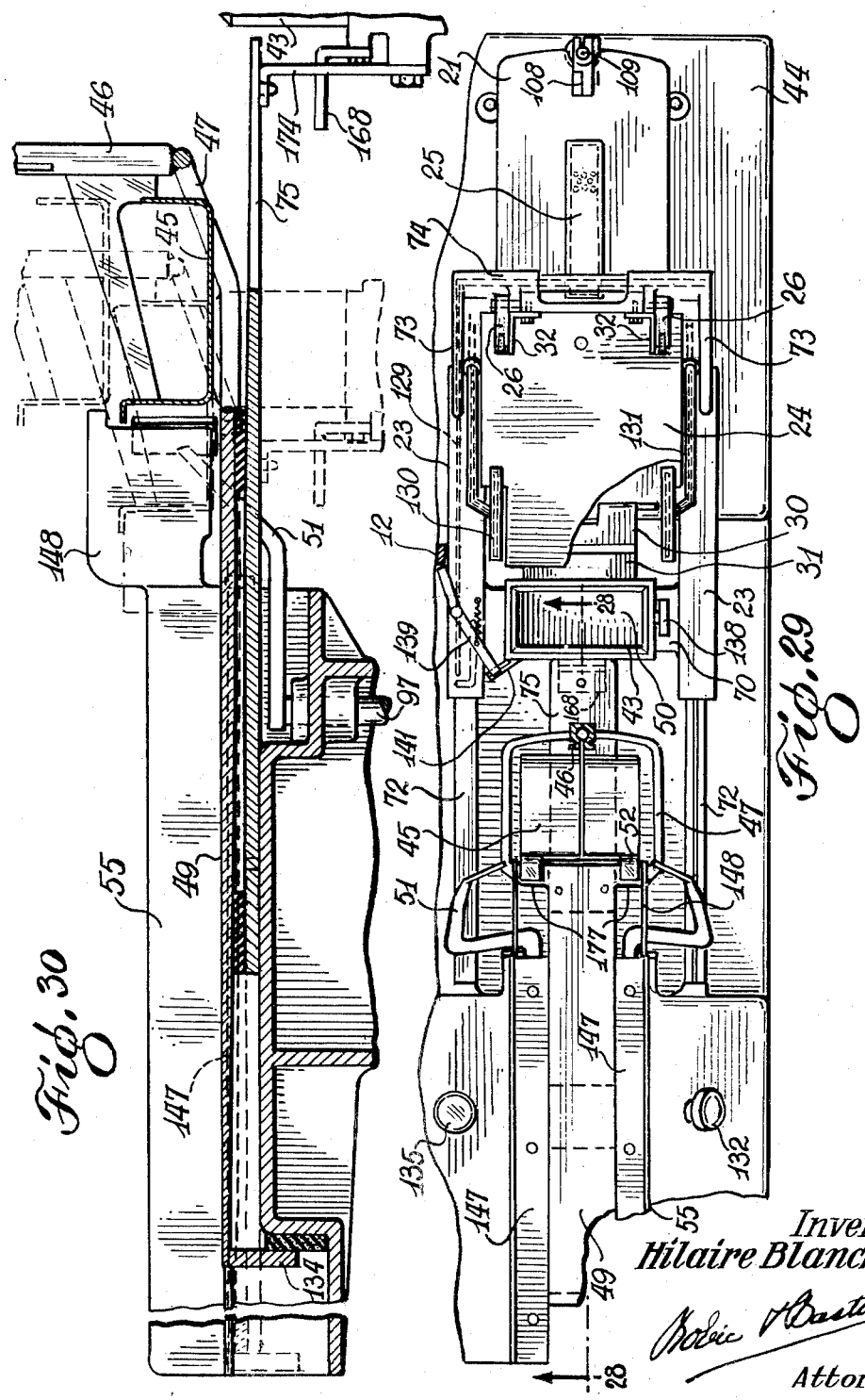

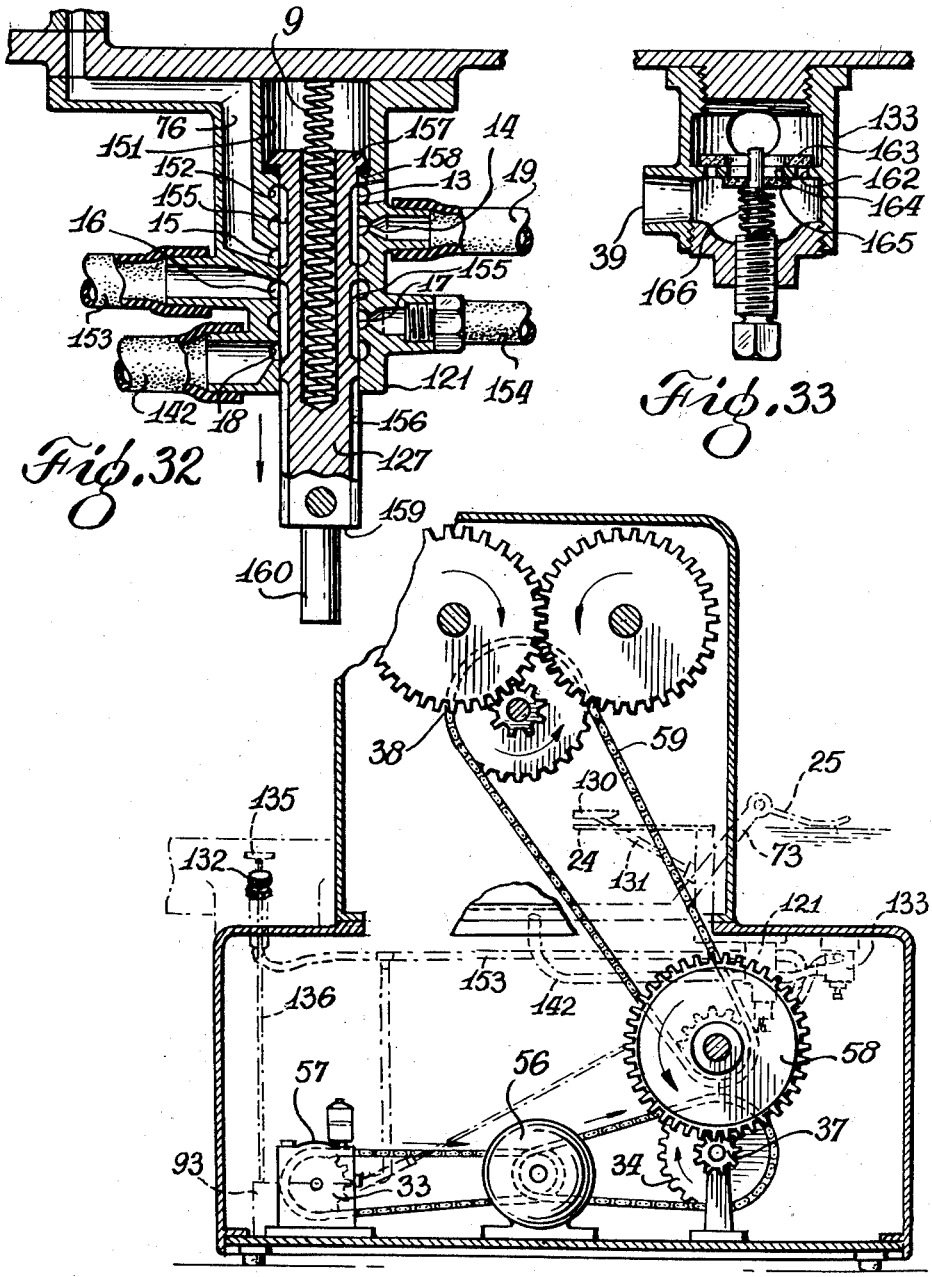

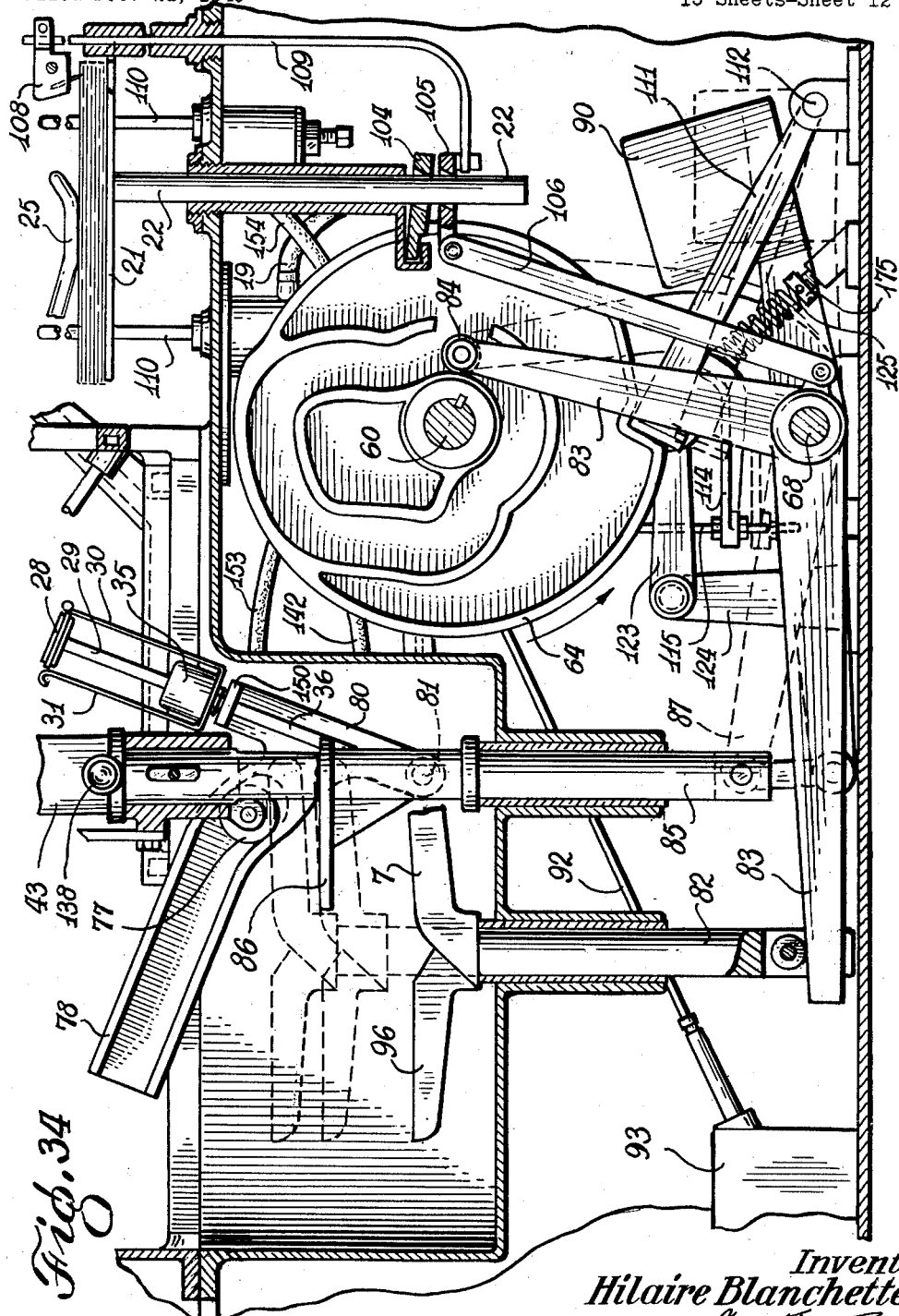

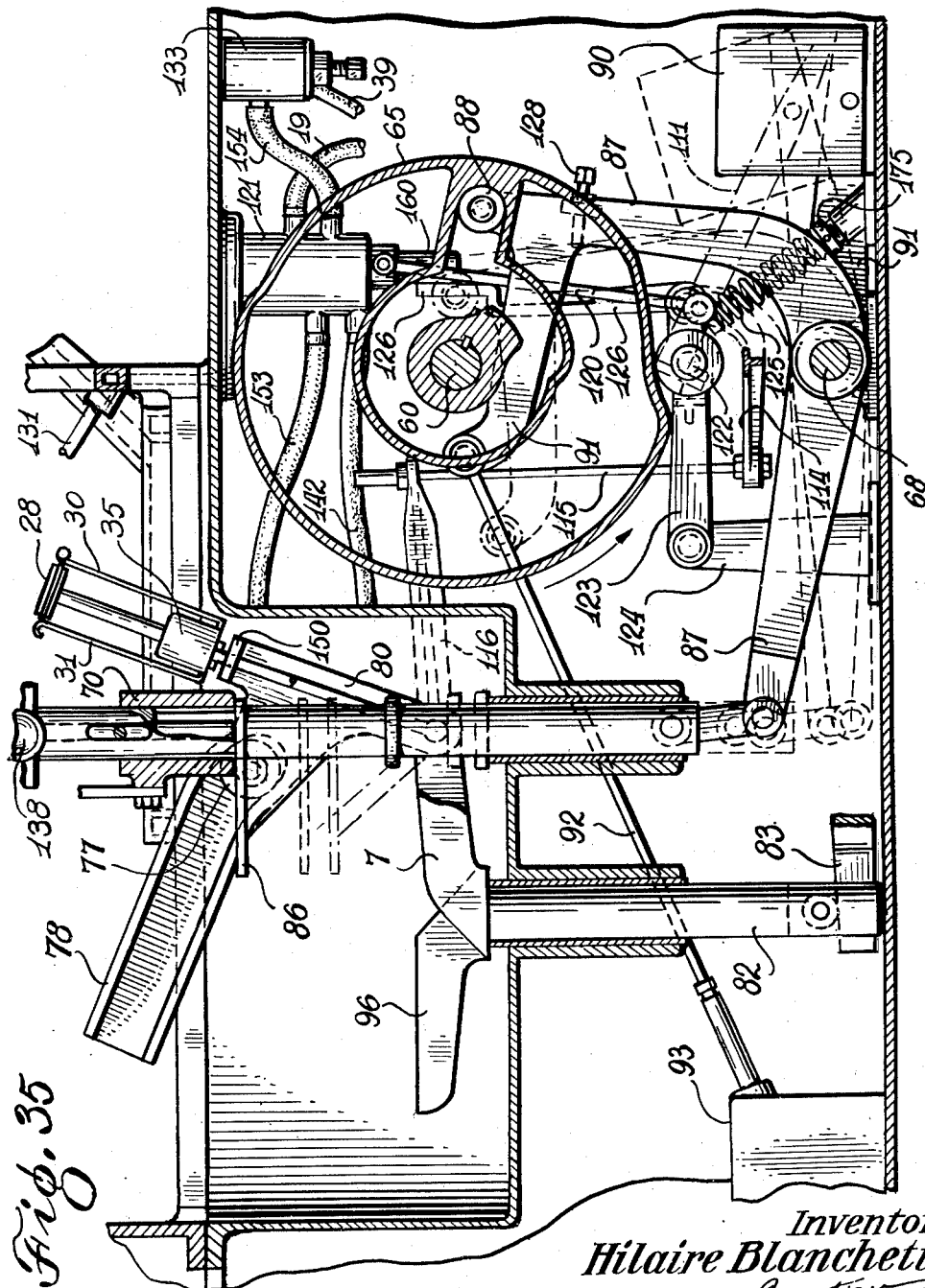

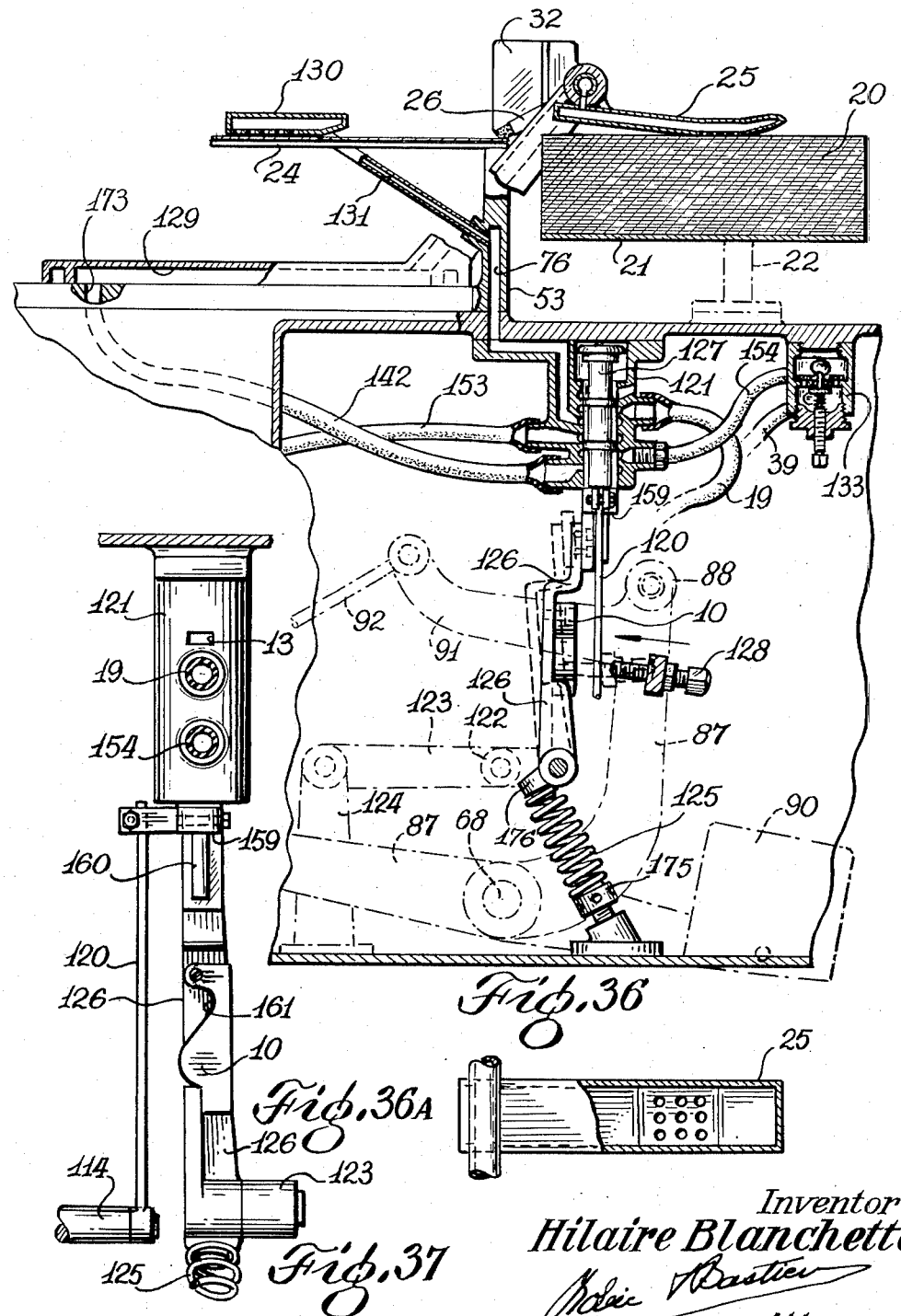

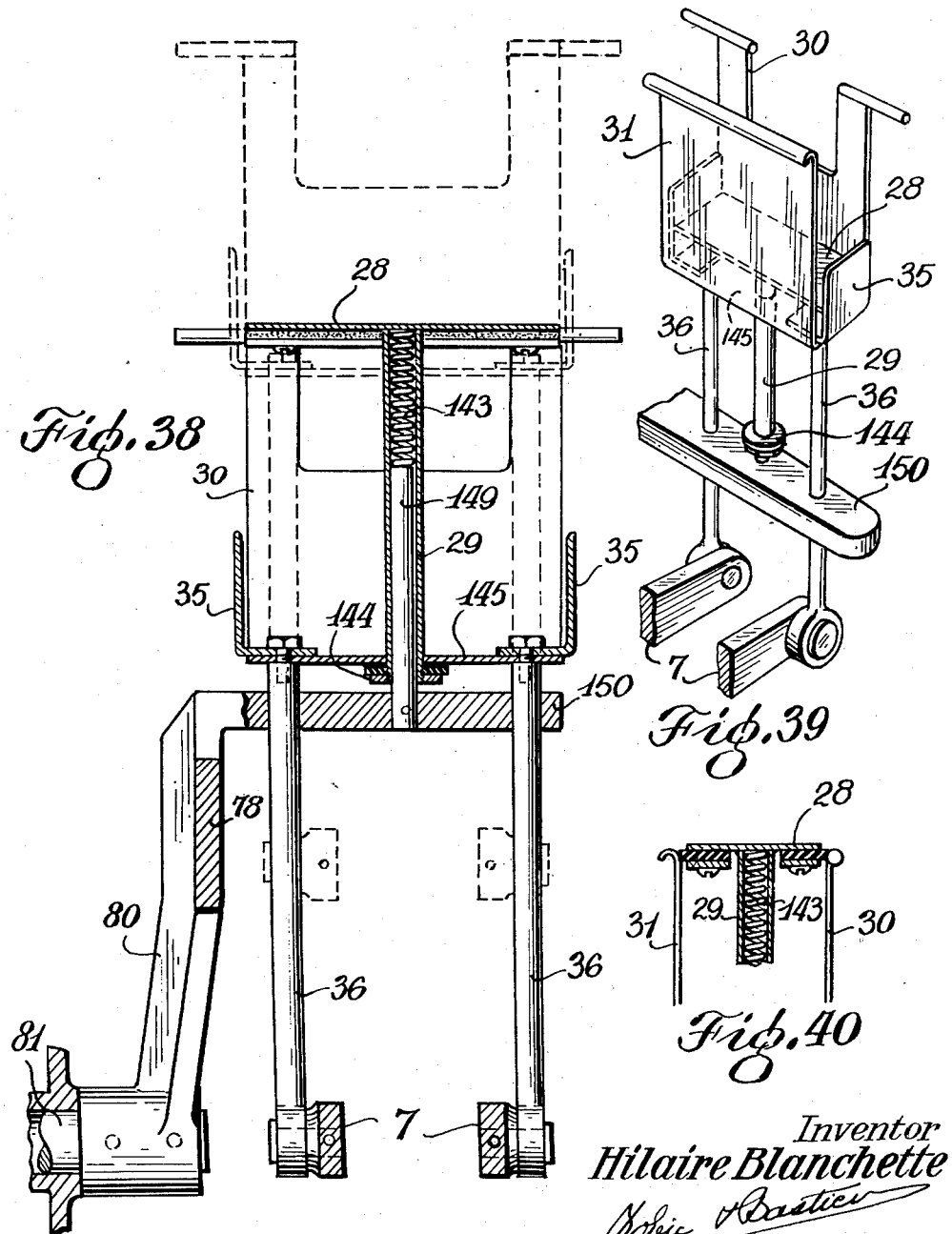

Patented Nov. 27, 1951

2,576,096

UNITED STATES PATENT OFFICE 2,576,096

MOLDING AND WRAPPING MACHINE

Hilaire Blanchette, St. Simon de Drummond, Quebec, Canada

Application December 21, 1949, Serial No. 134,324
In Canada May 8, 1946

22 Claims. (Cl. 93—2)

1

The present invention relates to a molding and wrapping machine and is a continuation in part of copending U. S. application for Patent No. 745,802, now abandoned, filed May 3, 1947, in the name of applicant.

More specifically, this invention particularly concerns the molding and the wrapping or packaging of such materials as butter, or the like, the material being extruded into units of a particular size and shape and then the individual unit wrapped.

The machine of the invention may perhaps be best realized in practice as a high speed butter molding and wrapping machine, and its features will include handling of the butter directly from the churn, at which time a large mass of the malleable, semiplastic material is dumped into the machine, to the point at which the butter emerges in wrapped units capable of being placed in cartons for shipment.

The main object of the invention is to provide an improved high speed butter molding and wrapping machine, wherein most of the operations are carried out automatically and a minimum of attendance is required upon the machine.

Naturally, in the accomplishment of the foregoing objective, it has been necessary to design several distinct material handling and wrapping mechanisms of a more or less subsidiary nature, each of which improvements also are included as objects of the invention.

Another important object resides in the provision of an improved material wrapper of the character set forth wherein the units separated from the mass of malleable material are formed into identical shapes, each having a predetermined mass.

Another important object is to provide a machine of the type set forth wherein the material is separated into units completely automatically with a minimum of attention being required by the machine operator.

Another important object is to provide a machine of this type capable of molding and wrapping material such as butter in the soft state, direct from the churn.

Another important object is to provide a machine of this type capable of molding and wrapping semi-solid material in various states of solidification.

Still another object resides in the provision of an improved mechanism in the machine for maintaining a stack of sheets in which the material is to be wrapped at a predetermined height for feeding into the machine.

2

Yet another object resides in the provision of improved sheet feeding means for a machine of the character described.

Still another object is to provide improved and simplified means for separating the material into units of predetermined characteristics such as weight and size.

And yet another object is to provide a machine of the type set forth wherein improved and simplified mechanisms are present for the purpose of wrapping a sheet about the units of material, the said mechanisms carrying out their functions by simple, easily initiated movements of a cyclical nature.

And another object is to provide a machine of the character set forth which is generally of improved design, may be operated at high speed in order to give rise to an economical forming and wrapping operation, and which is itself relatively inexpensive in construction and in operation when compared with other machines having similar functions.

Other objects and advantages will become apparent, or be further pointed out, in the description to follow.

In its general nature, the machine comprises a hopper in which the material to be wrapped is dumped, a feed mechanism by which the material is forced from the hopper into a funnel, a wrapping mechanism by which a sheet of wrapping paper is formed around the lower end of the funnel, a mold mechanism into which the material is extruded through the lower end of the funnel carrying the sheet of paper therewith, means for completing the wrapping of the sheet around the unit of material after the severing of said unit from the rest of the mass and means for ejecting the wrapped unit from the mold.

The operation of the machine hence becomes apparent. The butter is dumped into a hopper from whence it is fed down through a funnel around the lower end of which latter a sheet of wrapping paper is held. As a mold comes into line underneath the funnel and moves up to enclose the sheet and the funnel, the butter is extruded therein, together with its partially enclosing sheet, and the mold then moves away from the funnel to shear off a unit of butter from the rest of the mass. The bottom of the mold then rises relative thereto in order to urge the unit of material out whereupon the rest of the sheet is wrapped around the unit and the latter is slid out from the machine in its finished state ready to be packed into cartons for shipping.

As an example of the invention, and for purposes of illustration only, a preferred embodiment of the same is shown in the annexed drawings, wherein:

Fig. 1 shows a perspective view of the machine, showing the mold in lowered position for purposes of clarity.

Fig. 2 represents an elevation view, partly broken away, of the machine of Fig. 1 in the position stated.

Fig. 3 shows a detail elevation view, partly in section, of a portion of the actuating mechanism adapted to operate wrapper folding members which come into play near the end of the wrapping operation;

Fig. 5 shows a detail view of some of the members of Fig. 4 indicating the commencement of the wrapping of a sheet of paper upon the lower end of the material extruding funnel;

Fig. 6 shows a plan view, partly in section, corresponding to Fig. 5;

Fig. 7 shows in perspective view the manner in which the wrapper is folded about the lower end of the funnel in operation of Fig. 5;

Fig. 8 shows an elevation view of some of the mechanism of Fig. 4 indicating that phase of the machines wrapping operation occurring after the operation of Fig. 5;

Fig. 9 shows a plan view, partly in section, corresponding to Fig. 8;

Fig. 10 shows in perspective view the manner in which the wrapper is folded about the lower end of the funnel in the operation of Fig. 8;

Fig. 11 indicates the next phase of the machines operation after that of Fig. 8;

Fig. 12 indicates the manner in which the wrapper is formed relative to the lower end of the funnel after the operation of Fig. 11;

Fig. 13 indicates the next phase of the machines operation as the material receiving mold is positioned underneath the funnel;

Fig. 14 indicates the relative motion of the material mold and the portion of the machine adapted to fold the wrapper over the top of the latter;

Fig. 15 indicates in plan view and diagrammatically the manner in which the wrapper is folded by the operation of Fig. 14;

Fig. 16 indicates the same operation in elevation view, and

Figure 24:
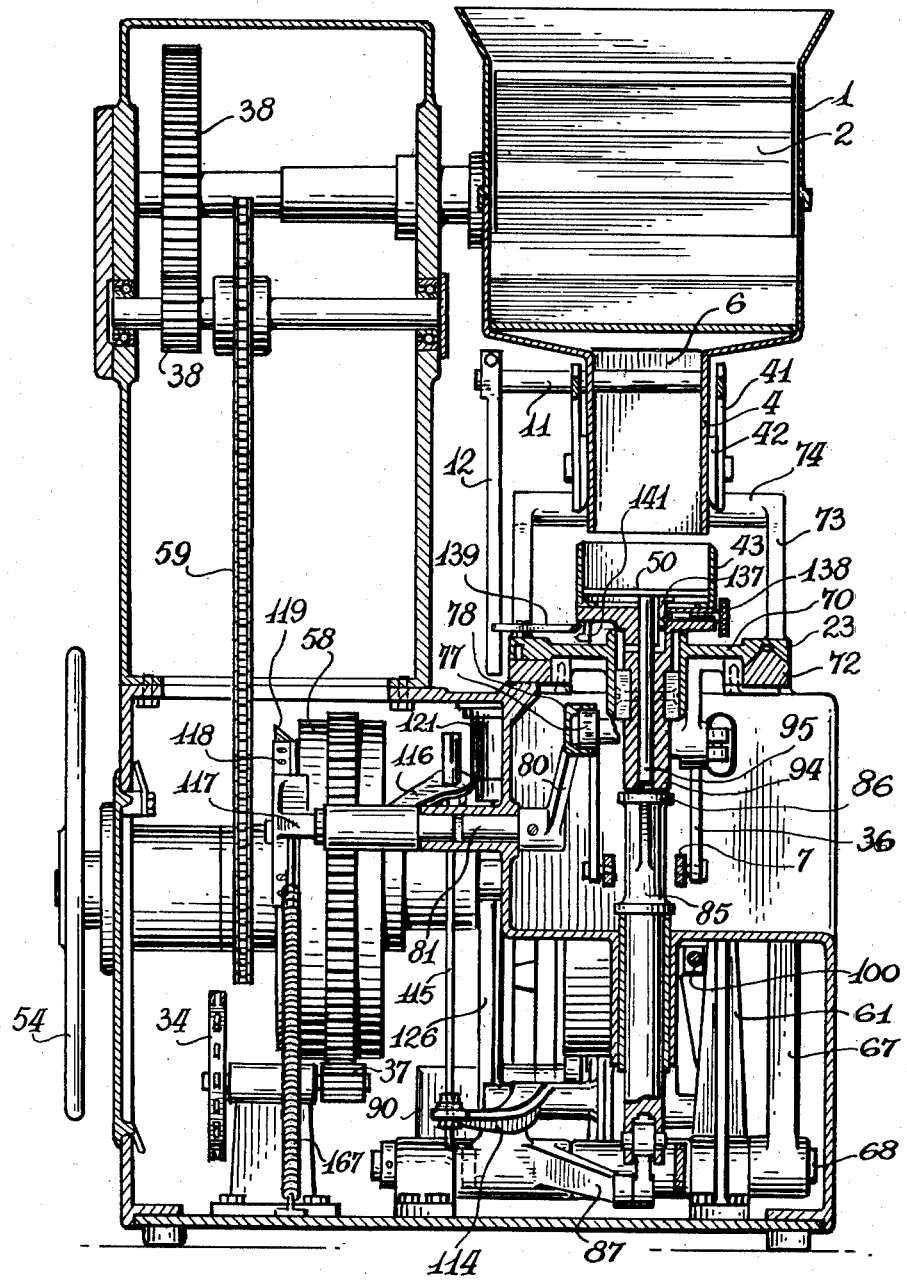

Fig. 17 shows in perspective view how this leaves the wrapper relative to the unit of material;

Fig. 18 shows in elevation view a detail of the next operation wherein the end corners of the wrapper are folded inwardly against the unit of material;

Fig. 19 indicates in perspective view the manner in which this leaves the wrapper relative to the unit of material;

Fig. 20 shows diagrammatically, in a transverse elevation view, the manner in which the folding elements move to carry out this operation under the control of the activating mechanism shown in Fig. 3;

Fig. 21 shows an elevation view the step in operation of the machine coming immediately after the steps indicated in Figs. 16 and 18, and Fig. 22 shows in perspective view the unit of material as completely wrapped by the final operation of Fig. 21;

Fig. 23 shows in transverse sectional elevation view a preferred arrangement of the moving parts which are driven by the source of power of the machine and which in turn transmit the necessary motions to the material handling and wrapping members. This view is taken along the line 23—23 of Fig. 2;

Fig. 24 is a sectional elevation taken along the line 24—24 of Fig. 2 and indicates the manner in which some of the mechanisms of Fig. 23 work into the machine and drive their controlled elements;

Fig. 25 indicates a plan view, partly in section, of the mechanism represented by the line 25—25 on Fig. 2;

Fig. 26 shows a plan view looking down on the clutch in Fig. 23 indicating the association of the latter with a braking mechanism for stopping the extrusion of butter at one stage of the operation of the machine;

Fig. 27 shows a section along the line 27—27 of Fig. 26;

Fig. 28 shows a section taken along the line 28—28 of Fig. 29;

Fig. 29 shows a plan view of the machine taken below the lower end of the material extruding funnel;

Fig. 30 shows a view similar to Fig. 28 taken at another point of the machines operation;

Fig. 31 shows diagrammatically, in a longitudinal elevation view, the chain drive and gear drive connections with which the source of power for the machine or motor drives into the several mechanisms;

Fig. 32 shows an enlarged detail sectional view through the main valve of the air system of the machine;

Fig. 33 shows a similar enlarged detail view of the choke in the air system of the machine;

Fig. 34 is an elevation view longitudinally of the machine indicating how the left hand side of the cam in Fig. 23 co-operates with its associated members to control the operation of some of the machine mechanisms;

Fig. 35 shows a similar view indicating the co-operation of the right hand side of the cam (as in Fig. 23) indicating the co-operation between this portion of the cam and its associated mechanism;

Fig. 36 indicates in a longitudinal elevation view, partly diagrammatic, the connections and operation of the air system included in the machine and co-operating with the sheet feeding mechanism;

Fig. 36a shows a detail view, partly in section, of one of the members in the sheet feeding mechanism indicating whereby air suction aids the said member to draw a sheet of the wrapping paper along therewith during the movement of the machine;

Fig. 37 shows an elevation view transverse to that of Fig. 36;

Fig. 38 shows in sectional elevation view the members adapted for preliminary folding of the wrapper about the bottom end of the funnel indicating the operation thereof;

Fig. 39 shows the same mechanism in perspective view; and

Fig. 40 shows a detail section through a portion of the mechanism indicating a limiting position during the operation thereof.

Referring now to the drawings, wherein is shown a preferred form of the invention as applied to a machine for the wrapping of butter to produce packaged units of identical weight and dimensions, it will be found preferable to first examine the parts and mechanisms through which the butter is passed and by which it is progressively handled and wrapped, examining the motion of each of these parts and mechanisms, and then to pass on to the machinery controlling the movements of the said butter handling and wrapping mechanisms.

Figs. 1, 2 and 3 best show the manner in which the butter may be fed into the machine, the material A being dumped in a plastic, semi-solid condition into the hopper 1. Inside the hopper 1, which may be of any preferred shape, will be disposed means adapted to force the material downwardly into a funnel opening at the lower end of the hopper. The said means for pressing the butter downwardly may consist of a pair of counter-rotating serrated cylinders 2 urging the butter downward therebetween past a deflecting member 3 and into a funnel 4 preferably rectangular in outline. Pressing against the counter-rotating cylinders 2, are two scrapers 5 preventing the butter to revolve around with the cylinders and forcing same down the funnel 4.

The gate 6, inside the hopper and just below one of the scrapers 5, is pivoted to a shaft 11, which shaft is connected to a depending arm 12, outside the hopper, extending downward near the sliding carriage in order to be actuated as will be described later.

The gate 6 is opened at the moment the extrusion must be stopped. It relieves the internal pressure of the plastic material which would otherwise cause continuing extrusion even after stoppage of the cylinders 2.

The sheets 20 in which the units of butter are to be wrapped are maintained in a stack upon the horizontal table 21 near the right hand end of the machine in Fig. 1. The said table 21 is carried on an upright shaft 22 whose movement is controlled from below in a manner hereafter described in order to maintain the uppermost sheet of the stack 20 at a predetermined level. As the horizontally reciprocating carriage of the machine (one portion of which is indicated by 23 in Fig. 1) moves to the left in Fig. 2, the sheet feeding member 25, secured to the carriage, carry the topmost sheet from pile 20 on to a delivery table 24 disposed horizontally just to the right of and below the lower end of funnel 4. At the same time as this member 25 moves to the left, so do the small pivoted fingers 26 which are fixed relative to the carriage and have leather shoes on their lower ends thereof resting by virtue of their weight upon the delivery table 24. The said fingers 26 push the single sheet of paper which is on the delivery table towards the left to a point underneath the lower end of funnel 4.

At this stage of the operating cycle, a wrapper forming mechanism comes into play which, as such, is called generically the wrapper former and will now be described.

As the single sheet of paper 27 is moved by the fingers 26 into position under the lower end of the funnel 4, a platform 28 moves upward to press the sheet and hold it firmly across the mouth of the funnel. The said platform 28 is secured on an upright depending sleeve 29 which is carried by the lower portions of the mechanism in a manner described below and indicated in Figs. 38, 39 and 40. Also carried upward, somewhat after the platform 28 has borne against the bottom of the paper, are a pair of members 30 and 31 adapted to push, respectively, the right hand and left hand ends of the sheet of paper 27 up flat against the outside of the corresponding upright surfaces of the funnel. These members are also connected in the manner shown in Figs. 38, 39 and 40 and will be dealt with in greater detail below.

Moving on to Fig. 5, it is seen that as the members 30 and 31 move upward, the leftwardly moving carriage brings lateral plates 32 in position so as to fold the right lateral corners of sheet 27 against the outside of the front and rear face of the funnel. This operation is completed as the carriage 23 reaches the leftward limiting position of its motion leaving the wrapper folded as indicated in Fig. 7 relative to the bottom end of funnel 4, although, as represented, the block of butter is substituted to the funnel for purposes of clarity.

Meanwhile, the members 30 and 31 together with the parts connected therewith continue to move upwardly until a second pair of lateral upwardly directed plates 35 are brought into play and fold the front and rear corners of the sheet up against the corresponding surfaces of the funnel (over plates 32) in the manner shown in Fig. 8 and diagrammatically evident from Fig. 10. As this operation is completed, the carriage is already beginning its rightward return movement to its original position and drawing plates 32 therewith, while the members 31, 30, 35 and 28 have all reached the limit of their upward motion.

A yoked member 40 (Fig. 4) having spaced upright lateral extremities 41 upon each of which is vertically slidable a plate 42 moves toward the funnel from the left being carried by the carriage. The lateral plates 42, upon coming into contact with the lateral edges of that portion of wrapper 27 which is disposed upright against the left face of the funnel, fold these edges to the right against the front and rear faces of the funnel, as indicated in Figs. 11 and 12, and hold the wrapper in position while the members 28, 30, 31 and 35 are withdrawn, as shown, into a lower position and as the machine carriage moves even further to the right in its retreating movement the said parts are tilted to the right (Figs. 2–34) and permit the mold 43 to be introduced underneath the bottom of the funnel so as to register therewith.

The said mold 43 is of inside dimensions corresponding with the lower outside end of the funnel an has an open top as well as a reciprocating bottom interior platform the purpose of which will be hereinafter described. As this mold comes into position directly underneath the funnel, taking the place of platform 28, it moves upward to enclose the bottom portion of the funnel and the wrapper as indicated in Fig. 13, the plates 42 being upwardly slidable and displaceable by the mold to permit this movement.

The butter is then extruded under a regulated pressure in a manner yet to be disclosed, enters the wrapper-lined mold and forces the latter downward until the mold is full, this operation allowing a certain mass of butter to be extruded and formed as a unit in the wrapper now inside the mold. As the mold is filled and just clears the lower edge of the funnel, it starts moving to the left. This sliding movement of the mold relative to the funnel severs by shearing the extruded unit from the main mass of butter in the funnel.

As the mold moves further to the left, the butter therein is completely enclosed in the sheet 27 of wrapping paper except for the projecting portion on the left hand side as indicated in Fig. 12. However, as the mold moves to the left, a flat horizontal member 45 (vertically slidable along an upwardly extending member 46 supporting members 40) pushes against the vertical face of wrapper 27 and flattens the latter across the top of the mold in the manner indicated in Figs. 14 and 16. At the same time, rods 47 parallel to the front and rear edges of plate 45 but spaced outwardly therefrom and having an upwardly bent right hand end 48 bending in to meet and support member 46, fold the front and rear edges of the wrapper downward over the front and rear sides of the mold (see Fig. 16).

At the left end limit of travel of the mold, its interior bottom platform 50 is urged upwardly to force the unit of butter out of the mold, whereupon the downwardly and loosely folded edge portions of the wrapper are pressed against the unit of butter on the front and rear ends of the latter by extension members 148 to be described later.

When the mold starts moving to the right, the unit of butter is forced completely out of the mold as in Fig. 18, and a pair of tucking members 51 disposed laterally of the mold but capable of pinching inwardly as shown in Figs. 20 and 18, press in against the right hand corners of the wrapper and pinch the same inwardly as shown in Fig. 19. These tucking members 51 retain the unit, while the mold and the horizontal member 45 move further to the right and transfer the unit onto the board 49.

To complete the enveloping of the butter in its package, the left hand edge of plate 45 is bent to form an upright face 52 which folds down the only remaining projecting portion of the wrapper as plate 45 moves to the right and, by its weight, falls off the right upper edge of the unit to finish the wrapping operation in the manner disclosed in Figs. 21 and 22. The tucking members 51 are then released to their outer spread apart position. The completely wrapped unit is thus left on the board 49, to be conveyed further to the left on the return of the carriage, in a manner which will be described later.

It is evident from the above just what are the main mechanisms which are utilized in the invention in order to handle the butter, form the material into units, sever the same from the main mass of the material as the mold moves to the left, and to wrap the unit in a single sheet of packaging material. Moreover, from the above description, the manner in which each of the mechanisms is required to move during the operation may be now understood in order to see the reason for the controlling machinery and the particular details of the constructions of the various mechanisms as will now be set forth. With respect to the said machinery, it may be emphasized that any preferred machinery may be utilized which will accomplish the desired result, that is, to make the butter handling and wrapping mechanism operate in the manner described. For purposes of efficiency and economy, as well as speed of operation, machinery similar to that described and shown herein has been used satisfactorily and found commercially practical.

This machinery includes driving cams and the like, to be described, and a source of vacuum for operating various elements, said source including a motor 56 imparting continuous movement to a vacuum pump 57, by means of a chain and sprocket wheel 33, and also operating an air suction clutch 58 by means of a chain and sprocket wheel 34 and a gear train 37 (Figs. 23 and 31).

The clutch 58 consists in a continuously rotating center web to which may adhere by suction two clutch plates (not shown) one of which is secured to the main drive shaft 60 and the other is secured to the bevelled wheel 119 and to the sprocket wheel 59 which in turn drives the gear train 38 connected to the butter feeding cylinders 2 described above.

A compound valve 121, described hereafter, connects the vacuum pump alternatively to the clutch plate actuating the cylinders 2, through the tubing 19, or to the clutch plate driving the main drive shaft 60, through the tubing 39.

Thus, the rotation of the butter feeding cylinders 2 is a movement independent of the remaining movements of the machine.

Journalled in a standard 61 as well as in the clutch and frame of the machine, there is a main shaft 60 which is adapted to rotate in counterclockwise direction, said shaft carrying a crank 62 which is operable to actuate the carriage. Mounted on this shaft, also, there are: a small cam 63 for controlling the movements of the tucking members 51, a double cam 64—65 to be described later and a hand wheel 54.

The carriage comprises two elongated parallelly spaced elements 23 in sliding contact (Figs. 1 and 29) with a horizontal double track bed 72 secured to the machine frame on both sides of the funnel 4.

At the left end of the carriage, the sliding elements 23 are joined together by the mold support 70 through which the mold 43 is vertically slidable. The right end of the carriage is constituted by upwardly inclined bars 73 connected together by a bridge 74 which supports the fingers 26, the folding plates 32 and the sheet feeding arm 25 over the delivery table 24 and the sheet feeding table 21.

The carriage has a horizontal reciprocatory movement imparted thereto by the crank 62 (Fig. 2) secured to the drive shaft 60. The roller 66 mounted on the free end of crank 62 slides in a longitudinal groove of arm 67 pivoted about a fixed shaft 68, said arm 67 actuating a hinged rod 69 attached at its free end to the mold support 70 of the carriage.

The stop 79 (Figs. 1 and 4) limits the rightward movement of the carriage and is adjusted so as to bring the mold 43 into vertical alignment with the funnel 4 when the carriage abuts said stop.

Referring to Fig. 1, it will be seen that the right ends of the bed tracks 72 have upright extensions 53 supporting the delivery table 24 and bridged by a cross piece 71 supporting, by means of hollow rods 131, the retainer elements 130 (Fig. 36).

The retainers 130 are maintained on both sides and just on top of the delivery table 24. They are elongated hollow elements having a perforated lower face parallel with the plane of the delivery table. A bore 76 formed inside the cross piece 71 and the rear extension 53 connects these retainers to the compound valve 121 and finally to the vacuum pump 57.

These retainers, when a vacuum is applied thereto, hold a wrapper 27 on the delivery table against the frictional action of the pusher fingers 26 and the feeding arm 25 as the carriage returns to the right. Suction is applied to these retainers by means of the compound valve 121 only when the carriage is moving to the right.

Conversely, suction is applied to the sheet feeding arm 25 by the compound valve 121, only when the carriage is moving to the left, thereby pulling a sheet from the top of the stack 20 onto the delivery platform 24. The arm 25, best shown in Figs. 36 and 36a, is hollow and its lower flat face has perforations through which suction is applied to the wrapper. This hollow arm 25 is connected to the compound valve 121 and finally to the vacuum pump 57 through the hollow bridge 74 (Fig. 29), the rear arm 73 and a channel 129 in the rear sliding element 23, said element being slidable over the port 173 of the bed and communicating by means of a tube 142 to the compound valve 121 (Fig. 36). Fig. 9 shows how arm 25 is pivoted to bridge 74.

Thus when the carriage moves to the left, the compound valve 121 opens the retainers 130 to the atmosphere and connects the sheet feeding arm 25 to the vacuum pump 57. Arm 25 then pulls a wrapper from the stack of sheets 20 onto the delivery table 24, while the pusher fingers 26 push the wrapper already on the delivery table, under the funnel 4. During the return movement of the carriage, the compound valve 121 opens the arm 25 to atmosphere and connects the retainers 130 to the vacuum pump. Said retainers hold the sheet just brought on the delivery table as the pusher fingers 26 and arm 25 move to the right and slide over the sheet held stationary by retainers 130. The above described mechanism constitute the feeding means for the butter wrapper sheets.

After the butter blocks have been wrapped, as previously explained, they are conveyed leftward along the channel 55 towards the packing station, where an operator places the butter in a carton or wood box.

For that purpose, a composite conveyor board is adapted to be reciprocated in a depressed cavity of the frame, below the level of the channel 55 and between the lower flanges 147 thereof. This board is also adapted to be raised above the bottom of the channel, for lifting the butter blocks from the channel, said movement being followed by a leftward longitudinal displacement of said board and the butter it carries. Thus, the board travels leftward in a raised position and, rightward, in a lowered position below the channel bottom.

This conveyor member consists of an upper board 49 and a lower one 75, both of which are wedge-shaped elements the thickness of which tapers off towards one end. They are disposed in relatively complementary fashion, with interposed friction pads 146, that is: the butt ends of the boards are in opposed relation to each other. As shown in Figs. 28–29–30, the lower board 75 has its thin end attached to the mold support 70 by means of a bracket 174 and, accordingly, is reciprocable therewith. The upper board 49 carries the wrapping mechanism 42—45—47 at one end and is provided with a left stop 134 limiting the rightward movement thereof. Said upper board is further formed, at the right, with lateral enlarged ears 177 (shown clearly in Fig. 14) the purpose of which is to limit the leftward movement of said board as the ears abut against the right end of the channel. Therefore, the upper board movement is limited to short alternative movements between the end stops 134 and 177, while the lower board 75 travels the full distance covered by the carriage itself.

As the lower board moves to the right, the upper board will be carried along by the friction of the pads 146 until stop 134 arrests further movement of 49; the lower board 75 still moving to the right, however, will cause a relative slippage between the boards and a raising of upper board 49 as the butt ends of said boards come together, the result being a lifting of the butter blocks in the channel 55.

As the carriage moves leftward, the frictionally held board 49 will be displaced to the left, with its load of butter, until ears 177 contact the end of 55. Further movement of 75 to the left will cause lowering of upper board by a relative displacement of the butt ends of the boards, until, the blocks again rest on the channel flanges 147. As the boards move rightward once more, the board 49 will move under said flanges and will not affect the position of the butter blocks. Said blocks are therefore advanced in short, intermittent steps along the channel 55.

From the foregoing, the final wrapping movements described above and shown in Figs. 15 to 22 may be easily understood.

Because the upper board 49, carrying plate 45, comes to a stop before the lower board 75, when the carriage is moving to the left, the mold 43 carrying the unit of butter slides relatively to said plate 45, thereby folding the upright flap of the wrapper across the top of the mold as in Fig. 14. At the left end of travel, the unit of butter is lifted from the mold against the plate 45, between two vertical extensions 148 of the guide channel 55. This lifting movement is completed when the carriage is returning to the right, at which instant the tucking members 51 come into play making the fold described in Figs. 19 and 20, and retaining the unit while the latter is transferred onto the moving board 49, after which the upright portion 52 of plate 45 makes the last fold as already described.

For preventing the lifting of the mold, when the unit of butter is forced out, a stop 168, secured at the left side of the mold, engages the machine casing at the left end limit of travel of the carriage (see Fig. 28).

This freshly wrapped unit of butter is held by the tucking members 51 while board 49 moves further to the right along with the carriage, and is transferred upon the horizontal edges 147 of the guide channel only on the next leftward movement of the carriage. From then on, it moves steadily to the left as described above.

The arrangement of the sliding boards 49 and 75 also explains why the folding and retaining members 42, mounted as described onto board 49, come first in contact with the wrapper 27 and the funnel 4, making the fold described and retaining the wrapper while the wrapping plates 31, 30 are withdrawn. The rightwardly moving upper board 49 comes to a stop first with elements 42 against the funnel 4, while the mold 43 continues to move to the right to come in line with said funnel and with said elements 42.

The tucking members 51 are swung arcuately by the rocking fingers 98, said fingers being engaged between the adjustable nuts 99 threaded on the rod 100. For reciprocating said rod longitudinally, a swinging arm 102 is connected thereto, the arm having a roller 101 in contact with a cam 63 mounted on shaft 60. A compression spring 8 keeps the roller 101 in contact with the cam.

The wrapper former mechanism, comprising elements 28, 30, 31, 35 is operated as is best shown in Figs. 38, 39 and 40. The vertically slidable plates 30, 31 and 35 are bolted to two parallel rods 36 and plates 30 and 31 have rolled top edges for sliding easily on the wrapper as they are raised along the funnel 4. This entire wrapping mechanism is tiltable sideways, to be removed from under the funnel 4, when the mold 43 comes to register therewith.

The former mechanism has, therefore, an arcuate movement about a pivot 81 on to the machine casing through an arm 80 having a right angle bend 150 receiving in slidable engagement the two rods 36. A post 149 is also secured to said arm 80 for supporting the platform 28 by means of the sleeve 29 slidable over the post.

Figure 4:
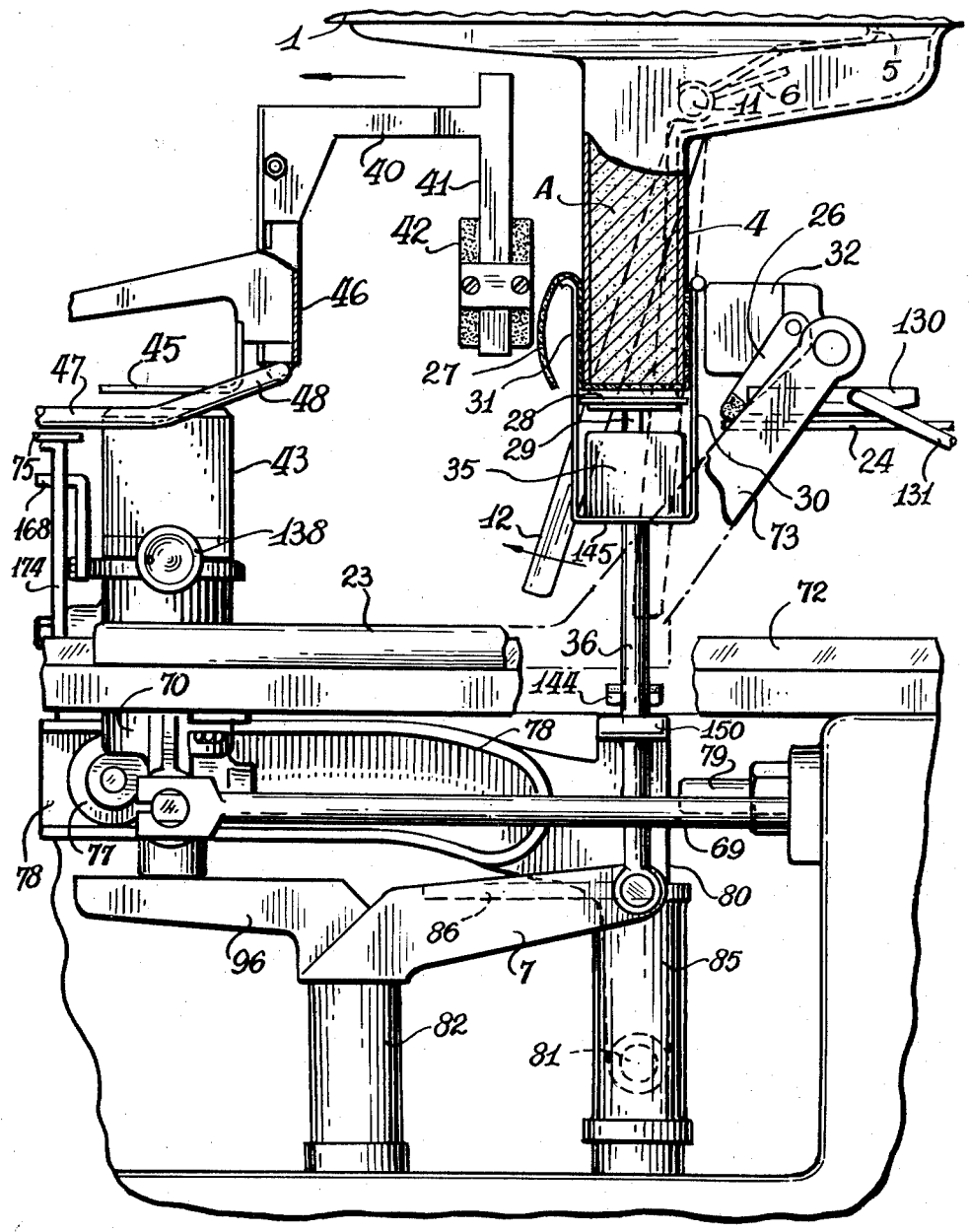
Fig. 4 shows an elevation view, partly in section, of the mid portion of the machine and indicates the movement of some of the material extruding and wrapping members thereof.

The arcuate movement of this mechanism is caused by the action of the roller 77 on the channelled extension 78 projecting right-angularly from arm 80. The said roller 77 is secured to, and movable with, the mold support 70; said roller operates to tilt the former in non-operative position only when the carriage is at the right of its reciprocating movement. Otherwise, the extension 78 is maintained horizontal (Fig. 4).

To prevent platform 28 from contacting the lower edge of the funnel 4, and the wrapping sheet, before said sheet is in proper position, said plate is held down against the action of spring 143 by depending sleeve 29 having a lower flange 144 engaged by cross plate 145 between rods 36; the platform 28 is gradually released against the funnel as the rods 36 move upwardly.

The folding plates 30, 31 and 35 are vertically displaced by the two parallel rods 36 pivoted to the forked element 7 (Figs. 4, 34 and 39); said element 7 is attached to a slidable vertical plunger 82 movable by a bell crank 83 pivoted about fixed shaft 68. Said crank is actuated by an end roller 84 following the contour of an inner race in a cam wheel 64 keyed to the main drive shaft 60.

To the top end of the plunger 82 there is mounted a finger 96 in mutually opposed relation with the fork 7, said finger being adapted to raise platform 50 when the butter unit is to be expelled from the mold. This platform (Fig. 24) is mounted at the top end of a rod 95 slidable inside the vertically movable piston 94 of the mold 43, said piston being slotted at its lower end for passage of the finger 96 when the carriage is at the left of its course. Thus, cam wheel 64 controls the vertical movement of the wrapper-former mechanism for the initial wrapping operation around the funnel, and of the mold bottom platform for extrusion of the unit of butter at the end of the final wrapping operation.

The mold 43 is vertically displaceable to enclose the lower end of funnel 4, when the carriage is at the right, or to uncover said funnel as the carriage starts moving leftward. This displacement is caused by the horizontal bracket 86 formed at the top of the plunger 85 movable vertically between the arms of fork 7, as shown in Fig. 35. Said plunger is linked to the cranked lever 87 pivoted about stationary shaft 68, and which lever is moved by the action of roller 88 engaged in a race of the cam wheel 65. The mold, when raised in funnel-engaging position, is subjected to the action of a counterweight 90 (Fig. 35) mounted at the end of an extension 91 on crank 87.

Consequently, the extrusion of the butter into the wrapper is effectuated against the constant pressure exerted by the counterweight 90; this pressure may be further adjustably increased by a dashpot 93 acting on the extension 91 through a rod 92, the stiffness of said dashpot being adjustable by a knob 135 (Fig. 29). Thus the extrusion counter-pressure may be adjusted according to the state of plasticity of the butter inside the hopper.

As will be explained later, the main drive shaft is momentarily stopped when butter is extruded into the funnel-engaged mold.

The table 21 carrying a stack of wrapping sheets is mounted upon a vertically movable shaft 22 and continuously adjusted at various levels, so that the top wrapping sheet is always at a suitable predetermined level to be drawn by the arm 25, irrespective of the stack thickness. The lower end of said shaft is engaged by the two clutch elements 104 and 105 having center holes formed at an angle, element 105 having a reciprocating vertical movement imparted thereto by arm 106, oscillated by a short lever 107 integral with bell crank 84. The upward stroke of arm 106 is adapted to move the table shaft upward by the clamping action thereon of element 105 when same is approximately horizontal. The table shaft is then retained in raised position by loose element 104, hinged to the machine frame. When the table is at the proper level, the finger 108 secured to the upper end of free rod 109, and in contact with the stack of sheets, raises the bevelled element 105 to align the aperture thereof with the shaft 22, thereby nullifying its upward action on said shaft. Fixed vertical guide rods 110 permits proper stacking of the wrapping sheets.

The controlling device for vacuum application to the machine elements is a compound valve 121 (Figs. 31, 32 and 36) comprising a cylinder 151 having a reduced bore formed with annular grooves 152. Said grooves correspond to the following six ports: port 13 opening to atmosphere; port 14 connecting through tubing 19 the clutch plate engaging the butter feeding cylinders 2; port 15 opening into bore 76 to the retainer elements 130; port 16 communicating with the vacuum pump 57 by means of tubing 153; port 17 leading to the choke 133 through tube 154 and, from the choke, to the clutch plate engaging the main drive shaft 60; port 18 connecting to the sheet feeding arm 25 by means of tubing 142 and the channels previously described.

A piston 127 movable vertically in the valve cylinder has three annular cavities formed therein, the two upper ones 155 each embracing three ports at a time, and the lower cavity 156 capable of placing the two lower ports 17—18 in communication with the atmosphere when the piston is moved to its top position.

Said piston has a top flange 157 co-operating with the seat 158 of the valve cylinder, for limiting the downward movement of the piston. A compression spring 9 inside the piston forces the same downwards.

The piston 127 can assume three positions. The down position as shown in Fig. 32 connects ports 16, 17 and 18 together, that is: the vacuum pump to the clutch plate of the main shaft and to the sheet feeding arm 25. In the down position, the piston also connects ports 13, 14 and 15 together, e. g. the clutch plate engaging the butter feeding cylinders 2 and the retainers 130 opened to atmosphere.

Therefore, the down position is taken to move the main mechanism, but only when the carriage is moving to the left. When the carriage moves to the right, the piston occupies the middle position for opening port 18 to atmosphere, that is: the sheet feeding arm is rendered operative, and connecting port 15 (the retainers 130), to the vacuum pump. The other connections remain as for the down position.

The up position of the piston opens ports 17 and 18 to atmosphere through groove 156, while vacuum to the clutch plate of the main drive shaft and to the arm 25 is cut off. The piston also connects ports 14, 15 and 16 together, that is: the vacuum pump to retainers 130 and to the clutch plate engaging the butter feeding cylinders 2. The up position is taken for the extrusion operation, while the carriage is stopped and the butter feeding cylinders extruding the butter into the wrapper lined mold.

The piston 127 of the compound valve 121 is primarily actuated by a lever 123 pivoted to pedestal 124 secured to the base of the machine. Said arm is oscillated by the action of roller 122 rolling on the outside periphery of cam 65 (Fig. 35).

An arm 126 is pivoted at the free end of lever 123 and contacts at its upper end against the shoulder 159 formed above the stem 160 of the piston 127.

A heavy spiral spring 125 secured at one end to the base of the machine and having its tension adjustable by a nut 175 performs the dual action of pressing the roller 122, on the outside periphery of cam 65, and of urging the arm 126 against the stem 160 of the valve piston 127. As shown in Fig. 26, said spring is secured at its top end to a lug 176 of arm 126 adjacent its pivot to lever arm 123. Thus the valve piston 127 is raised in a controlled manner in synchronism with the lever 123.

However, the arm 126 is adapted to clear the valve piston 127, to allow dropping thereof, when stop screw 128 engages arm 126 as the crank is rocked in a counterclockwise direction during the extrusion operation.

To effect the severing of the butter in the mold against the lower end of the funnel, at the end of the extrusion operation, the main drive shaft must be started when the mold just clears the funnel; therefore, the piston 127 must be tripped before the counterclockwise rocking movement of the bell crank 87 brings the mold to the down limit of its vertical movement. For that purpose the stop screw 128 contacts a thick shim 10 (Figs. 36 and 37) mounted on arm 126, when said arm is at its top vertical movement. This shim 10 is engaged by the screw before the arm is reached for contact and, hence, trips the valve before the mold is completely down. When the mold reaches its downward position, after the shearing operation, the stop screw is brought further to the left, but must not move the arm 126 which, at this moment, is actuating the piston 127. Therefore, the plate 10 has a lower recess 161 where the stop screw 128 can enter without actually contacting the arm 126.

To bring the rotating main mechanism to a quick stop always in the same position, this is: with the carriage at the end of its rightward course, a stop lever 111 is connected to the valve piston 127 by a rod 120 pivoted to a projecting side arm 114 (Figs. 23, 34, 36 and 37).

This stop lever is pivoted on pin 112 and in spaced relation with the outer periphery of cam 64. When it is lifted with the valve piston 127, by spring 125, it engages into the recess 113 of cam 64 thereby stopping the main drive mechanism, while the butter feeding cylinders 2 are started with the compound valve piston in its up position.

To the side arm 114 of the stop arm and actuated by the valve piston, is also attached another vertical rod 115 actuating horizontally pivoted rigid arms 116 and 117 and brake shoe 118 (Figs. 24, 26 and 27).

When the valve piston is brought to its down position, thereby disengaging clutch plate actuating the butter feeding cylinders 2, the brake shoe 118 is pressed against the bevelled extension 119 of said clutch plate, by means of downwardly moving arm 117, so as to bring the rotating cylinders to a quick stop. A tension spring 167, attached to the base of the machine and to the brake shoe 118, keeps the latter in co-action with arm 117.

Gate 6, which serves to relieve the internal pressure of the butter inside the funnel at the end of the extrusion, is opened by the action of the following mechanism. A bent lever 139 (Figs. 24 and 29) is pivoted centrally to rear element 23 so as to rock in a horizontal plane and is spring pressed to engage and urge to right the depending arm 12 of gate 6; said gate is accordingly kept closed when the carriage is at the right end of its travel.

Upon extrusion, mold 43 is lowered and bevelled element 141 mounted thereunder, contacts the similarly bevelled left end of lever 139 and pivots same to clear depending arm 12. Said arm 12 then swings to the left, due to the pressure exerted by the opening gate 6.

As the carriage returns the lever 139 engages arm 12 to close gate 6, whereby the mechanism is ready for the extrusion operation.

It is to be noted that in the vacuum system described heretofore, the sheet feeding arm 25 and the clutch plate engaging the main drive would be evacuated simultaneously through the compound valve; thus arm 25 would start to the left from its rightward limit before having time to grasp a wrapper 20 thereby resulting in slippage of said arm 25 relative to said wrapper. A choke 133 is therefore inserted in the line from the compound valve to the clutch plate engaging the main drive, to provide a time lag during which vacuum is applied to the sheet feeding arm 25 before the main drive shaft starts to move said arms to the left to initiate the transferring of a wrapper 20. For that purpose the clutch is evacuated through the restricted annular opening 162 closed by annulus 163 inside the choke 133.

When the main drive mechanism must be stopped, the compound valve piston reaches its top position before the carriage has completed its rightward travel. Thus the butter feeding cylinders 2 start rotating and by the time platform 50 of the upwardly moving mold touches the lower edge of funnel 4 the bulging wrapper 27, maintained around the funnel, prevents the mold from cutting the wrapper by providing a butter cushion.

The choke 133 is placed in the air line of the carriage clutch plate to ensure an adequate suction on the arm 25 feeding the sheets, before the vacuum is applied to the clutch through the opening 164 of the choke, this opening being closed by a disc 165 and adjustable spring 166 (Fig. 33).

Thus this choke provides a fixed resistance (opening 162) to the passage of air when the system is evacuated, and an adjustable resistance (opening 165) to air flow upon admission of the latter into the system.

The following adjustments are found on the machine. Knob 135 controls through rod 136 the tension of the spring of the hydraulic dashpot 93, thereby stabilizing the pressure under which the material is being extruded from funnel, as previously stated. Knob 138 (Fig. 24) on the mold rotates a needle screw entering a bore in which a depending element 137 under the platform 50 enters, thereby adjusting its bottom position to control the amount of material being extruded. The valve 132, connected directly to the vacuum pump, serves to open the vacuum system to the atmosphere when the machine is idle.

With all the main elements described, it is now possible to visualize the operation of the machine as an integrated unit. For instance, the moment the carriage 23 starts its leftward movement, with the material extruded into the mold 43, said mold has just been disengaged from the funnel 4, and stop arm 111 is down together with the piston of the compound valve, while the main shaft rotates.

The sheet feeding arm 25, under vacuum on, transfers one wrapping sheet from table 21 to the delivery platform while fingers 26 push the sheet already on the platform to the left under the funnel, the elements 130 being at this stage connected to atmosphere. The tiltable wrapper former is brought to vertical position, by the roller 77 of the mold support 70, engaging grooved element 78. Thus platform 28 contacts the wrapping sheet and holds it under funnel 4. At the same time, the sliding movement of mold 43 relative to the funnel 4, severs the extruded mass from the funnel as the mold clears the edges of said funnel. On further movement to the left, the mold plunger 94 is removed from the lowered plate 86 and the mold then comes under flat element 45, the left hand flap of the wrapping sheet is folded while, at the same time, the cam 64 raises both the bottom platform of the mold, to lift the wrapped unit of butter, and the side vertical plates of the tiltable wrapper former, folding a wrapper around the funnel. The vertical plates 32, on the carriage, then come into play. All this time, the wrapped units are being moved to the left on the guide channel. At the end of the leftward travel, and at the beginning of the rightward movement of the carriage, the butter in the mold is completely lifted from the mold, the tucking arms 51 come in action to make a fold as described and to hold the unit as the carriage moves further to the right and the board 49 slipped under the unit.

On the return trip of the carriage, the arms 42 fold the last flap of the wrapping sheet around the funnel and hold it in place while the titlable wrapping former and the mold bottom plate are lowered at the same time. Said wrapping former is then tilted to the right in non-operative position and the mold is transferred onto plate 86 to be actuated by cam 65.

Meanwhile, at the start of the return trip, the compound valve has been brought from the down to the middle position, cutting off vacuum in arm 25 and applying vacuum to elements 130 so as to retain new sheet on platform against the drawing action of fingers 26 and arm 25. Near the end of the return trip, the carriage closes gate 6 inside the hopper, by means of levers 12 and 139. The mechanism is then in the position shown on the drawings at the end of the return trip, e. g. at the rightward end of travel and the mold is in alignment with and under funnel 4.

The stop lever is raised and stops the rotation of the main drive shaft as it enters the recess of cam 64 as shown in Fig. 34. The piston of compound valve also assumes its up position: this disengages the main drive mechanism and engages rotary cylinders 2. Meanwhile the mold has been raised by means of counterweight 90, completely enclosing the funnel and the wrapper sheet 27. As the feeding cylinders are started, the butter is extruded into the mold pushing the latter downwards over the pressure exerted by counterweight 90 and the resistance offered by the dashpot to preclude uneven extrusion. The downward movement of the mold trips lever 139 opening gate 6 inside the hopper, slightly before the mold clears the funnel, while the valve piston is disengaged to fall down: the cylinders 2 are stopped rapidly by brake 118, and the main drive shaft is started. The carriage starts to the left, the mold severs a unit of material from the funnel, and the cycle is repeated.

From the foregoing, it is to be noted that the main mechanism does not operate unless butter is fed into the hopper, because the downward movement of the mold which trips the valve, is obtained through the extrusion of the butter. Whenever the hopper is empty, only the cylinders are rotating.

The machine is very easily cleaned; since the controlling mechanism is completely enclosed and the exposed parts made of corrosion resistant material, the machine can be simply cleaned by playing thereon a steam or hot water jet.

The completely wrapped units of butter are placed directly in a container 169 held in a convenient position upon a bracket 170 mounted at one end of a double arm 171, said arm being centrally pivoted at the free end of a side arm 172 hinged at the left end of the machine. A similar bracket 170' holding an empty container 169' is mounted at the opposite end of arm 171.

When the container 169 is full, the arm 171 is swung to the rear, arm 172 is rotated to bring the empty container 169', into position and arm 172 swung back to its original position thereby abutting the bracket against the guide channel 55.

While a preferred form of the invention has been herein shown and described, it is to be understood that various changes may be made in the details of the construction and in the combination and arrangement of the several parts, within the scope of the claims, without departing from the spirit of this invention.

The embodiments of the invention in which an exclusive property or privilege is claimed are defined as follows:

1. In a wrapping machine, a funnel having an open discharge and, means for supporting a sheet of pliable material across said end, means for forming said sheet into a wrapper on said end, a mold having an open top in communicating alignment with said end, means for forcing material from said funnel into said wrapper to inject the latter into said mold, means for shifting said mold laterally of said funnel, whereby to sever the material deposited in said wrapper, a wrapper supporting platform in said mold, means for elevating said platform in said mold, a slidable board in the plane of said elevated platform, and means for bringing said slidable board beneath the wrapper as said platform is displaced horizontally.

2. In a wrapping machine, a funnel having an open discharge end, means for supporting a sheet of pliable material across said end, means for forming said sheet into a wrapper on said end, reciprocable mold having an open top in communicating alignment with said end, means for forcing material from said funnel into said wrapper to inject the latter into said mold, means for shifting said mold laterally of said funnel, whereby to sever the material deposited in said wrapper, a wrapper supporting platform in said mold, means for elevating said platform in said mold, to eject the partly wrapped material therein a board slidable with the mold in the plane of said elevated platform and tucking fingers engageable with the wrapped material to hold the same as the board is brought underneath by the return movement of the mold.

3. In a wrapping machine, a funnel having an open discharge end, means for supporting a sheet of pliable material across said end, means for forming said sheet into a wrapper on said end, a mold having an open top in communicating alignment with said end, means for forcing material from said funnel into said wrapper to inject the latter into said mold, means for shifting said mold laterally of said funnel, whereby to sever the material deposited in said wrapper, a wrapper supporting platform in said mold, means for elevating said plate from said mold, a slidable board in the plane of said elevated platform and means for bringing said slidable board beneath the wrapper on withdrawal of said supporting plate.

4. In a wrapping machine, a quadrangular funnel having two side walls and two end walls and an open discharge end, means for temporarily supporting a sheet of wrapping material across said end, means for wrapping said sheet on the side and end walls of said funnel to form a wrapper with one side wall taller than the other, a movable hollow mold adapted to register with the funnel and to overlie the same and the sheet wrapped thereon, means for forcing a plastic substance in said funnel against the wrapper sheet to withdraw the same from the funnel into the mold, and means for folding the excess of the taller wrapper side wall upon the shorter side wall to enclose the substance in the wrapper, and means for ejecting the wrapped substance from the mold.

5. In a wrapping machine, a funnel having two side walls and two end walls and an open discharge end, means for supporting a sheet of pliable material across said end, means for wrapping said sheet on the side and end walls of said funnel to form a wrapper with one side wall taller than the other, means for withdrawing the wrapper from said funnel, and means for folding the excess of the taller side wall upon the shorter side wall to form a lid, and means movable along said side and end walls for forming flaps from said lid into engagement with said side and end walls.

6. In a wrapping machine, a funnel having two side walls and two end walls and an open discharge end, means for supporting a sheet of pliable material across said end, a pair of arms movable lengthwise of said funnel, said arms having portions lying transversely in the planes of the funnel end walls, a folding member carried by said arms and lying transversely of said funnel adjacent to one of its side walls, and means for reciprocating said arms, whereby the first named portions thereof fold said sheet against the funnel end walls and the folding member folds the sheet against the adjacent funnel side wall.

7. In a wrapping machine, a funnel having two side walls and two end walls and an open discharge end, means for supporting a sheet of pliable material across said end, a pair of arms movable lengthwise of said funnel, said arms having portions lying transversely in the planes of the funnel end walls, a folding member carried by said arms and lying transversely of said funnel adjacent to one of its side walls, and means for reciprocating said arms, whereby the first named portions thereof fold said sheet against the funnel end walls and the folding member folds the sheet against the adjacent funnel side wall, means for folding a portion of said sheet against the opposite side wall of the funnel, means for removing the folded sheet from the funnel, and means for folding one of the funnel-sidewall-engaging parts of said sheet transversely into engagement with the opposite funnel-side-wall-engaging part to form a lid.

8. In a wrapping machine, a funnel having an open discharge end, means for supporting a sheet of pliable material across said end, means for forming said sheet into a wrapper on said end, a mold having an open top in communicating alignment with said end, means for forcing material from said funnel into said wrapper to inject the latter into said mold, means for shifting said mold laterally of said funnel, whereby to sever the material deposited in said wrapper, a wrapper supporting platform in said mold, means for raising said platform to eject the wrapped material from the mold, means including a horizontal plate for completing the wrapping of the material as the laterally moving mold passes under said plate, a slidable board in the plane of said raised platform and means for bringing said slidable plate beneath the wrapper as the raised platform of the mold is being withdrawn by the return movement of said mold toward its initial funnel-registering position.

9. In a machine for wrapping blocks of plastic substances, a quadrangular funnel having an open discharge end, means for positioning a sheet of wrapping material across said funnel end, a vertically movable spring plate adapted to press the sheet against said discharge end, a pair of folding plates movable vertically after the spring plate to fold the sheet transversely against two opposite sides of the funnel, laterally movable pads for folding the sheet on the ends of the funnel, an open-topped mold adapted to register with the outside of the funnel, yieldable means for raising said mold to overlie the funnel and wrapped sheet thereon, means for forcing a plastic substance in the funnel and into the wrapped-lined mold, which is lowered against the action of the yieldable means, means for shifting the mold laterally after filling for shearing the plastic substance between the edges of mold and funnel, a platform inside the mold, means for lifting said platform to eject the partly-wrapped substance, horizontal plate means for lowering the remaining flap of the wrapper, arcuately movable tucking members for tucking in the ends of the lowered flap, said members holding the wrapped substance as the mold is laterally displaced, and a board movable with the mold adapted to receive the wrapped material as the mold is carried away.

10. In a machine for wrapping a plastic substance into quadrangular blocks, a quadrangular funnel through which the plastic substance is extruded, means for folding a sheet of wrapping material on the four sides and across the discharge end of said funnel to form a wrapper, an open-topped mold, means for moving said mold vertically to overlie the sheet-wrapped funnel, means for extruding a given quantity of plastic substance to fill the sheet-lined mold and force same downward, means for shifting the mold laterally to shear the substance in the wrapper, means for ejecting the partly-wrapped block from the mold, means for folding the wrapper sheet across the uncovered top of the block, tucking members for turning in the corners of the sheet free end, and a slidable board movable to a position underneath the block as the mold moves to its funnel-engaging position and said block held stationary by the tucking members.

11. In a machine for wrapping blocks of a plastic substance, a quadrangular funnel through an end of which the substance is intermittently extruded, means for previously wrapping a sheet of wrapping material around the four faces of the funnel and across the extruding end thereof, a mold having an open top movable in registration with the funnel end, means for raising said mold to embrace the wrapped funnel means for extruding a quantity of substance to fill said wrapper-lined mold, means for shifting the mold laterally to sever by shearing the substance in the mold, means for completing the wrapping of the block, a slidable board adapted to receive the said block as the mold is shifted to its funnel-embracing position, and means for imparting to said board an intermittent alternative movement for conveying the wrapped block towards a packing station.

12. In a machine for wrapping a plastic bulk substance in the form of quadrangular blocks, a quadrangular vertical funnel having an open discharge end, means for intermittently extruding through said end a quantity of the plastic substance, a horizontal table adjacent the discharge end of the funnel, vacuum means including a source of vacuum for picking a sheet of wrapping material from a stack thereof, positioning same on said table and sliding it across the funnel end, a wrapper former pivoted below the funnel in the axis thereof, said former being arcuately inclinable away from the funnel end and including a spring pressed plate, means for raising said plate across the funnel end to hold the wrapper sheet thereagainst, spaced parallel plates co-operatively associated with the sheet-picking means for effectuating initial lateral end folds in the sheet against the ends of the funnel adjacent the table, vertical plates movable laterally adjacent to and in delayed unison with said spring-pressed plate for folding two opposite sides of the wrapper sheet against diametrically-opposed sides of the funnel, spaced parallel pads movable to fold the remaining ends of the wrapper against the funnel opposite the table, means for withdrawing the wrapper former and inclining same away from the funnel, the wrapper being held in place by the pads, a mold having an open top adapted to embrace the funnel and wrapper thereon, said mold being displaceable longitudinally from a position underneath the funnel end to a position away therefrom, means for yieldably raising said mold until it overlies the funnel end and the wrapper wrapped thereon, control means for actuating the material extruding means to fill the wrapper-lined mold as it is lowered against the yieldable raising means, means for displacing the mold laterally after being filled to sever by shearing the substance therein, a platform in said mold over which the filled wrapper rests, means for raising said platform to expel the wrapped block therein, a horizontal plate yieldably movable vertically above the mold for folding a lid over the unwrapped top of the block as said block is repelled from the mold, spaced parallel rods co-operatively associated with the horizontal plate for initiating the folding down of the lid ends, vertical spaced parallel plates between which the block is raised as it is expelled from the mold for completing the ends-folding operation, arcuately movable tucking members for tucking in the ends of the lid flap and for holding the wrapped block against movement with the mold starting its return movement towards the funnel, and a board movable with the mold and adapted to slide under said block as it is held by the tucking members.

13. In a machine for forming a plastic bulk substance into uniform blocks and wrapping same in suitable wrappers of pliable material, a mechanism enclosing casing, a carriage slidable horizontally on top said casing means for reciprocating said carriage, a quadrangular extruding funnel having an open bottom discharge end and disposed with its axis perpendicular with the operational plane of the carriage, means for extruding the plastic substance through said funnel end, a table adjacent to and in the plane of the discharge end, friction means actuated by the carriage for picking a sheet of wrapping material on said table and carrying it across the discharge end of the funnel in laterally symmetrical but longitudinally offset position relative to said end, a wrapper former movable arcuately from an inoperative position to a position immediately underneath the funnel axially therewith, means for raising said former and, therewith, a spring-urged plate for pressing the sheet against the funnel end, side plates on the former for folding the sheet longitudinally against the sides of the funnel to form a short side adjacent the table and a taller one on the opposite side, spaced parallel plates movable with the carriage adapted to fold the wrapper ends on the short side, spaced plates at the lower end of the former for folding the bottom ends of the wrapper against the funnel and succeeding the carriage plates as the former continues its upward movement, means for reversing the movement of the carriage to return same towards the table, a pair of spaced pads movable in unison with the return movement of the carriage for folding the tall end of the wrapper against the ends of the funnel and holding the wrapper thereon as the former is lowered and swung arcuately away from the funnel, a hollow mold secured to the carriage so as to register in alignment with the funnel as the carriage moves to its extreme paper-picking position, means for raising said mold to embrace the funnel and the wrapper thereon, means actuated by the carriage movement initiating actuation of the substance extruding means, a counterweight urging the mold upwardly against the pressure of which butter is extruded into the wrapper-lined mold to lower same, means actuated by the downward movement of the mold for initiating actuation of the carriage away from the table, the laterally moving mold severing the substance from the funnel, means including an horizontal plate for closing the wrapper over the severed substance in the mold, and a composite carrier comprising a pair of relatively slidable boards for receiving the wrapped block and conveying same towards a packing station.

14. In a machine as claimed in claim 13, a source of motive power in the casing, a vacuum pump driven by said source, a vacuum clutch also driven by said source, said clutch being adapted to drive selectively a main shaft and the plastic substance extruding means the carriage reciprocating means comprising an oscillating arm secured to the casing, a crank on the main shaft engaging said arm, a connecting rod between said arm and carriage, a double cam mounted on the main shaft comprising a pair of opposed peripheral cam faces and a pair of inner races, a bell crank pivoted to the casing and having a roller at one end engaging the inner race of the first cam, a plunger actuated by the free end of the bell crank and constituting the raising means for the wrapper former and the mold platform, a second plunger movable vertically in the casing, a second bell crank pivoted medially to the casing and connected at one end to the second plunger, the free end of the said second crank engaging the inner race of the second cam, said inner race being substantially circular and having a radial extension in which the free end of the crank is held stationary during the extruding process, said second plunger and crank constituting the mold raising means, an horizontal bracket atop the second plunger on which the mold rests as it is moved by the carriage, a counterweighted extension on the second bell crank for urging the mold upwardly and a dash pot between said crank and casing for regulating the extrusion process in accordance with the plasticity of the substance being extruded.

15. In a machine as claimed in claim 13, the wrapper former comprising a quadrangular casing open at the top and having spaced parallel side walls, shorter parallel end walls, a pair of spaced parallel rods securing at their upper ends the side and end walls, a vertically movable fork to the ends of which the rods are secured for reciprocating the wrapper former vertically, a cranked arm journaled in the machine casing through the crank part of which the rods extend, a channelled arcuate extension on said arm, a roller secured to the mold engageable in said channelled extension, whereby longitudinal movement of the mold will rock the wrapper former back and forth, an upright post secured to the crank of the arm in axially parallel relation to the rods, a sleeve slidable over the rod, a platform forming a movable bottom of the former secured to said sleeve, a spring between said post and platform for urging the same upwardly, and a stop washer at the bottom of the sleeve for limiting the upward movement of the platform.

16. In a machine as claimed in claim 13, the block-conveying means comprising a channel having a bottom depressed guideway, an upper board slidable in said guideway and of tapered cross-section, a stop at the outer end of said board for limiting inward movement thereof, a tapered lower board also slidable in the guideway and having its butt end opposite the tapered end of the upper board, frictional contact pads between the boards, a bracket for securing the lower board to the mold, stops on said upper board for limiting the outward movement thereof, side parallel rods angularly and upwardly directed at their ends to initiate the folding down of the wrapper lip ends, a standard secured to the ends of said rods, spaced parallel pads slidable vertically on said standard for folding the taller end sides of the wrapper, an horizontal plate attached to the standard between the folding rods to flatten the lid over the severed substance, and a vertical flange at the outer end of the plate for folding down the remaining end of the folded down lid.

17. In a machine as claimed in claim 13, the tucking members comprising a pair of rectangular plates, S-shaped arms supporting said plates, and journalled in the casing for oscillatory movement, fingers right-angularly projecting from said arms adjacent the journalled ends, a peripherally-grooved member in which said fingers are engaged, a rod supporting said grooved member, a return spring on said rod, and a rotating cam inside the casing for imparting a reciprocatory movement to the rod.

18. In a machine as claimed in claim 13, the wrapper sheet picking means comprising friction pads attached to the carriage and movable therewith across the table, hollow stationary wrapper retainers just above said table and under which the sheet is adapted to pass, said retainers having its under face perforated, a duct for applying a vacuum to said retainers for holding the sheet on the table against the return movement of the picking pads, pivoted sheet feeding pickers also perforated at their bottom face and movable with the carriage, a vertically movable table adapted to receive a stack of wrapping sheets over the topmost sheet the pickers rest, a clutch adapted to connect the movable table with a vertically reciprocable member, a feeler finger engaging the top of the sheets stack and adapted to actuate the clutch, whereby the sheet of the stack is maintained constant with respect to the first delivery table irrespective of the thickness of said stock.

19. In a machine as claimed in claim 13, the substance extruding means having a pair of corrugated rolls for forcing the bulk substance through the funnel, a by-pass pressure-relieving gate between rollers and funnel, a lever depending downwardly from said gate, a pivoted latch on the casing for holding said lever, and a bevelled element on the mold for tripping the latch as the filled mold is lowered, whereby the extruding pressure in the funnel is released through the by-pass to stop extrusion.

20. In a machine of the character described having a sheets stack levelling means, sheet picking and carrying means, a plastic substance compacting and conveying means and a source of motive power for actuating all of said means, in combination therewith, an extruding funnel through which the substance conveyed is extruded, means including successively actuated flat members for folding around and across the end of the funnel a sheet of material forming a wrapper enclosing the funnel, control means for activating the extruding means to fill the wrapper around the funnel, a mold having an open top for enclosing the wrapper as it is filled to maintain the shape thereof, a platform in the mold to eject the substance-filled wrapper in the mold, means including tucking members for folding down a lid over the wrapped substance mass, and a composite tapered boards conveyor for receiving the wrapped substance and intermittently carrying same towards a packing station.

21. In a machine for handling a plastic bulk substance such as butter, compacting the same for extrusion through a quadrangular nozzle and wrapping separately as units blocks of the substance severed by shearing from the nozzle, means including spaced parallel plates operating on two sides of the nozzle for folding around the sides thereof and across the nozzle mouth a sheet of wrapping material to form an open-topped wrapper for the substance, a mold adapted to enclose said wrapper and nozzle as substance is extruded into the wrapper to fill it, means for raising said mold to a wrapper-enclosing position, means for allowing lowering of the mold as the wrapper is being filled, means for displacing the lowered mold laterally to sever the block from the mass in the nozzle, wrapper-closing means comprising a flat horizontal plate under which the block is moved by the mold, an ejecting platform in the mold for transferring the block unto a conveyor, and means for alternately moving said conveyor and the block thereon towards a packing station.

22. For wrapping blocks continuously and automatically from a supply of bulk plastic substance, a machine comprising an extruding funnel, means for forcing butter in said funnel, means for folding around said funnel and across its extruding end a sheet of wrapping material to form a quadrangular wrapper, a mold movable to overlappingly enclose said funnel and wrapper thereon, means for yieldingly raising said mold into overlapping position over the funnel, control means for initiating actuation of the forcing action whereby to extrude a quantity of substance directly in the wrapper against the pressure of the mold until said wrapper and mold are filled, control means actuated by the downward movement of the mold to initiate lateral displacement thereof for severing the butter therein from the funnel, a platform in the mold for ejecting the butter filled wrapper, and means including a conveyor for closing the wrapper and transporting the wrapped block towards a packing station.

HILAIRE BLANCHETTE.

REFERENCES CITED

The following references are of record in the file of this patent:

UNITED STATES PATENTS

| Number | Name | Date |
|---|---|---|
| 646,355 | Butler et al. | Mar. 27, 1900 |
| 997,712 | Smitt | July 11, 1911 |
| 1,849,438 | Rumsey | Mar. 15, 1932 |
| 2,010,523 | McClatchie | Aug. 6, 1935 |
| 2,094,402 | Grover | Sept. 28, 1937 |
| 2,163,106 | Ness | June 13, 1939 |
| 2,229,864 | Moore | Jan. 28, 1941 |
| 2,307,124 | Guyer | Jan. 5, 1943 |
| 2,323,467 | Guyer | July 6, 1943 |
| 2,360,846 | Bronander | Oct. 24, 1944 |
| 2,379,655 | Russell et al. | July 3, 1945 |

FOREIGN PATENTS

| Number | Country | Date |
|---|---|---|
| 702 | Great Britain | Dec. 19, 1896 |